United States Patent
Fukuta et al.

(10) Patent No.: US 7,923,166 B2
(45) Date of Patent: Apr. 12, 2011

(54) SEPARATING MEMBRANE FOR FUEL CELL

(75) Inventors: Kenji Fukuta, Yamaguchi (JP);
Kazuyuki Sadasue, Yamaguchi (JP);
Masayuki Kishino, Yamaguchi (JP)

(73) Assignee: Tokuyama Corporation, Yamaguchi (JP)

(*) Notice: Subject to any disclaimer, the term of this patent is extended or adjusted under 35 U.S.C. 154(b) by 644 days.

(21) Appl. No.: 11/993,653

(22) PCT Filed: Jun. 30, 2006

(86) PCT No.: PCT/JP2006/313530
§ 371 (c)(1),
(2), (4) Date: Dec. 21, 2007

(87) PCT Pub. No.: WO2007/004716
PCT Pub. Date: Jan. 11, 2007

(65) Prior Publication Data
US 2010/0081029 A1    Apr. 1, 2010

(30) Foreign Application Priority Data

Jul. 1, 2005    (JP) ................. 2005-193630
Sep. 30, 2005    (JP) ................. 2005-288035

(51) Int. Cl.
*H01M 8/10*    (2006.01)
*C08J 5/22*    (2006.01)
(52) U.S. Cl. ................. 429/492; 521/27
(58) Field of Classification Search ........... 429/492, 429/493, 494; 521/27
See application file for complete search history.

(56) References Cited

U.S. PATENT DOCUMENTS

| | | | |
|---|---|---|---|
| 4,705,636 A * | 11/1987 | Small et al. | 521/27 X |
| 7,534,515 B2 * | 5/2009 | Nam et al. | 429/493 |
| 2010/0173224 A1 * | 7/2010 | Schlenoff | 429/494 |

FOREIGN PATENT DOCUMENTS

| | | |
|---|---|---|
| JP | 07-246336 | 9/1995 |
| JP | 11-335473 | 12/1999 |
| JP | 2001-135328 | 5/2001 |
| JP | 2001-167775 | 6/2001 |
| JP | 2002-100373 | 4/2002 |
| JP | 2002-329500 | 11/2002 |

* cited by examiner

*Primary Examiner* — Stephen J. Kalafut
(74) *Attorney, Agent, or Firm* — Norris McLaughlin & Marcus P.A.

(57) ABSTRACT

The present invention discloses a membrane for a fuel cell, comprising: a solid polymer electrolyte membrane composed of a crosslinked ion exchange resin, and a polymer having a weight-average molecular weight of 5,000 to 1,000,000 and having a charge group of polarity opposite to that of the ion exchange group of the ion exchange resin, which polymer is adhered onto at least one surface of the solid polymer electrolyte membrane in an amount of 0.0001 to 0.5 mg/cm$^3$, preferably in a state that, when the membrane for fuel cell is immersed in a 50 mass % aqueous methanol solution of 30° C., there is substantially no difference in the adhesion amount of the polymer before and after the immersion; and a membrane-electrode assembly for a fuel cell, comprising the above-mentioned membrane, and a catalyst electrode layer bonded to the membrane, which catalyst electrode layer contains an ion exchange resin having the same polarity as the crosslinked ion exchange resin composing the solid polymer electrolyte membrane, and a catalyst substance.

6 Claims, 1 Drawing Sheet

SEPARATING MEMBRANE FOR FUEL CELL

TECHNICAL FIELD

The present invention relates to a membrane for fuel cell, a process for production thereof, and a membrane-electrode assembly for fuel cell. Explaining in more detail, the present invention relates to a membrane for polymer electrolyte fuel cell, composed of a crosslinked ion exchange resin membrane, a process for production thereof, and a membrane-electrode assembly for fuel cell.

BACKGROUND ART

Ion exchange membrane is in wide use as a membrane for cell (e.g. polymer electrolyte fuel cell, redox flow cell or zinc-bromine cell), a membrane for dialysis, etc. Polymer electrolyte fuel cell using an ion exchange membrane as the electrolyte is an power generation system in which a fuel and an oxidizing agent are fed continuously, then they are reacted, and the resulting chemical energy is taken out as an electric power; and it is an power generation system which is clean and highly efficient. In recent years, this power generation system has increased its importance for uses in automobile, household and portable device because it can be operated at low temperatures and can be produced in a small size.

Polymer electrolyte fuel cell has, in general, a solid polymer membrane functioning as an electrolyte. Onto the both sides of the solid polymer membrane are bonded a gas diffusion electrode having a catalyst loaded thereon. In this fuel cell, a fuel (which is hydrogen gas, methanol or the like) is fed into a chamber (fuel chamber) in which one of the gas diffusion electrodes is present, and an oxygen-containing gas as an oxidizing agent (e.g. oxygen or air) is fed into a chamber in which the other gas diffusion electrode is present. When, in this state, an external load circuit is connected to the two gas diffusion electrodes, the fuel cell works as such.

Of fuel cells, direct methanol fuel cell in which methanol is used per se as fuel, is easy to handle because the fuel is a liquid, is inexpensive, and, therefore, is expected as a electric power source of relatively small output, used especially for portable device.

The fundamental structure of polymer electrolyte fuel cell is shown in FIG. 1. In FIGS. 1, 1a and 1b are partition walls of fuel cell, provided so as to face each other. 2 is a groove-shaped fuel passage formed in the inner surface of the partition wall 1a. 3 is a groove-shaped oxidizer gas passage formed in the inner surface of the partition wall 1b. 6 is a solid polymer electrolyte membrane; on one side thereof is formed a fuel chamber side diffusion electrode layer 4 and on the other side is formed an oxidizer chamber side gas diffusion electrode layer 5. The solid polymer electrolyte membrane 6 electrically insulates a fuel chamber 7 from an oxidizer chamber 8; however, proton permeates the solid polymer electrolyte membrane 6.

The principle of this polymer electrolyte fuel cell is explained on a case of proton-conductive type fuel cell which uses a cation exchange membrane as the solid polymer electrolyte 6. The hydrogen or methanol fed into the fuel chamber 7 reacts at the fuel chamber side diffusion electrode layer 4, generating proton (hydrogen ion) and electron. The proton passes through the inside of solid polymer electrolyte membrane 6 and reaches the oxidizer chamber 8, where the proton reacts with the oxygen in air or oxygen gas, generating water. Meanwhile, the electron generated at the fuel chamber side diffusion electrode layer 4 passes through an external load circuit (not shown) and reaches the oxidizer chamber side gas diffusion electrode layer 5. At this time, the external circuit is provided with an electric energy.

Ordinarily, in a polymer electrolyte fuel cell having such a structure and in a case of proton-conductive type fuel cell, a cation exchange membrane is used as the solid polymer electrolyte membrane. In a case of anion-conductive type fuel cell, an anion exchange membrane is used as the solid polymer electrolyte membrane. These ion exchange membranes are required to have low electrical resistance, high water retention, stability during long-term use and high physical strength.

As such an ion exchange membrane, there has been mainly used a non-crosslinked perfluorocarbonsulfonic acid membrane when the ion exchange membrane is, for example, a cation exchange membrane. This membrane has high chemical stability. However, being insufficient in water retention, the membrane tends to dry and resultantly show reduced proton conductivity. Further, since the membrane is insufficient in physical strength, it is difficult to allow the membrane to have a small thickness for lower electrical resistance. Furthermore, when the membrane is used as a membrane for direct methanol fuel cell, there tends to occur a problem of phenomenon that methanol permeates the membrane, i.e. a so-called methanol cross-over phenomenon.

In order to solve these problems, researches on ion exchange membranes other than the perfluorocarbonsulfonic acid have been under way actively, in recent years. As one of such ion exchange membranes, there is a so-called hydrocarbon-based solid polymer electrolyte membrane. As an example, it was proposed to use an ion exchange membrane obtained by using, as a substrate, a porous film made of polyethylene or the like and integrating this substrate with an ion exchange resin. As the ion exchange resin, hydrocarbon-based ion exchange resins such as polystyrenesulfonic acid and the like are in use. Ordinarily, these hydrocarbon-based ion exchange resins have a crosslinked structure formed by copolymerizing bi- or higher functional crosslinking monomers such as divinylbenzene and the like. An ion exchange membrane obtained by integration of a hydrocarbon-based ion exchange resin having such a crosslinked structure and a substrate, is good at dimensional stability, heat resistance and mechanical strength. Further, the ion exchange membrane containing a substrate is greatly suppressed in methanol permeability (reference is made to, for example, Patent Literatures 1 and 2).

In order to further increase the proton conductivity of ion exchange membrane and further reduce the methanol permeability of ion exchange membrane, there is also known an ion exchange membrane impregnated with a polymer having a charge group having a polarity opposite to that of the ion exchange group possessed in the ion exchange membrane. In this ion exchange membrane, the ion exchange group and the charge group of polarity opposite to that of the ion exchange group form an ionic bond inside the membrane. In this ion exchange membrane, there is used, as the polymer having a charge group of opposite polarity, a liquid polymer or a polymer of relatively low molecular weight dissolved in an organic solvent. This technique is employed also in the hydrocarbon-based ion exchange membrane and there is disclosed a hydrocarbon-based ion exchange membrane having an ion pair formed therein (reference is made to Patent Literatures 3 and 4).

In producing a fuel cell using, as the solid polymer electrolyte membrane, a crosslinked hydrocarbon-based, ion exchange membrane which, as mentioned previously, is low in methanol permeability and superior in dimensional stability, heat resistance, etc., there is a problem that bonding is insufficient between the electrolyte membrane and the fuel chamber side gas diffusion electrode layer and oxidizer chamber side gas diffusion electrode layer, bonded to the both sides of the electrolyte membrane.

Each of the above catalyst electrode layers is ordinarily formed with a catalyst such as platinum or the like, an electron-conductive substance such as conductive carbon or the like, and an ion-conductive substance such as cation exchange resin, anion exchange resin or the like. In bonding the catalyst electrode layer, ordinarily, the above materials are kneaded using a dilution solvent to produce a paste, at first. Then, the paste is coated on the surface of the solid polymer electrolyte membrane, followed by drying and hot-pressing, whereby catalyst electrode layers are bonded to the electrolyte membrane.

When the solid polymer electrolyte membrane is a non-crosslinked ion exchange membrane such as the above-mentioned perfluorocarbonsulfonic acid membrane or the like, the hot-pressing can strongly fusion-bond the catalyst electrode layer to the solid polymer electrolyte membrane. However, when the solid polymer electrolyte membrane is, for example, a cross-linked hydrocarbon-based ion exchange membrane, no sufficient fusion-bonding takes place and the bonding strength between the electrode layer and the electrolyte membrane is significantly low.

When the bonding between the solid polymer electrolyte membrane and the catalyst electrode layer is insufficient, the ion conductivity at the bonding interface between them is low. When a fuel cell is produced using a membrane for fuel cell, of insufficient bonding, the internal resistance of the fuel cell is large. Also, even when the bonding interface between the membrane and the catalyst electrode layer has a relatively good ion conductivity at the initial stage of fuel cell use, the bonding between the membrane and the catalyst electrode layer is reduced further with the passage of use period owing to, for example, the swelling of bonded portion by methanol. As a result, there occurs a problem that the catalyst electrode layer portion is peeled from the solid polymer electrode membrane in a relatively short period.

This problem is improved slightly when the ion exchange membrane is subjected to a treatment of impregnation with a polymer having a charge group of polarity opposite to that of the ion exchange group of the membrane. In these known techniques, the above-mentioned polymer is impregnated into the solid polymer electrolyte membrane, whereby an ion pair is formed near the surface of the electrolyte membrane and a composite layer is formed (Patent Literature 3). The polymer used is a liquid polymer having a molecular weight of several hundreds, which is impregnated easily into the electrolyte membrane (Patent Literature 4). The most part of the polymer impregnated is present inside the electrolyte membrane and the amount of the polymer having a charge group of opposite polarity, present on the surface of the electrolyte membrane is very small. Therefore, the above method for obtaining higher bonding strength by polymer impregnation for formation of ion pair using a charge group of opposite polarity and resultant strong bonding between the electrolyte membrane and the catalyst electrode layer is not effective.

As described above, there are still various inconveniences in order to use the above-mentioned, cross-linked hydrocarbon-based ion exchange resin as a membrane for fuel cell; and there remain tasks to be overcome, such as strong bonding with catalyst electrode layer, superior ion conductivity of bonding portion, low methanol permeability, dimensional stability, heat resistance and the like.

Patent Literature 1: JP-A-1999-335473
Patent Literature 2: JP-A-2001-135328
Patent Literature 3: JP-A-2001-167775
Patent Literature 4: JP-A-2001-236973

DISCLOSURE OF THE INVENTION

The present inventors made a study in order to solve the above problems. As a result, the present inventors thought of an idea that there is adhered, onto the surface portion of a solid polymer electrolyte membrane composed of a crosslinked ion exchange resin, to which a catalyst electrode layer is to be bonded, a polymer of particular weight-average molecular weight, having a charge group of polarity opposite to that of the ion exchange group possessed by the ion exchange resin, in a particular amount. The polymer is unlikely to permeate into the ion exchange resin particularly when the ion exchange resin is highly crosslinked and the polymer having a charge group of opposite polarity has such a large molecular weight as not specifically shown in the above-mentioned known literatures. Therefore, the polymer having a charge group of opposite polarity continues to adhere to the surface of the electrolyte membrane in a large amount. As a result, the bonding between the solid electrolyte membrane and the catalyst electrode layer is improved and a fuel cell using this membrane can produce a high output.

Even with such a membrane, however, there are cases that the high output of fuel cell reduces when the use period of fuel cell is prolonged.

The present inventors made a further study on this problem. As a result, it was confirmed that the reduction in cell output is caused by the deactivation of the catalyst carried on the catalyst electrode layer.

Detailed description is made below on this point. In the membrane for fuel cell, which is produced by adhering, on the surface of a solid polymer electrolyte membrane, the above-mentioned polymer having a charge group of opposite polarity, the adhered polymer having a charge group of opposite polarity contains, in some cases, a fraction which forms no ion pair with the ion exchange group of the ion exchange resin composing the solid polymer electrolyte membrane. This polymer fraction (which forms no ion pair) dissolves, during fuel usage, in a fuel (e.g. an aqueous methanol solution), an aqueous methanol solution permeated by cross-over, etc. The fuel dissolving the polymer fraction diffuses into the catalyst electrode layer, causing the poisoning of catalyst by polymer.

Based on the above finding, the present inventors thought of a method of removing, from the electrolyte membrane, the polymer fraction having a charge group of opposite polarity but forming no ion pair, by washing the polymer-adhered electrolyte membrane with an organic solvent. That is, as a result of various investigations, there was obtained a conclusion that the deactivation of catalyst substance can be judged to be preventable by immersing the solid polymer electrolyte membrane in an aqueous methanol solution to such a state that there is substantially no difference in the adhesion amounts of the polymer of opposite polarity before and after the immersion.

The above studies have led to the completion of the present invention.

The present invention is as described below.

[1] A membrane for fuel cell, comprising:
a solid polymer electrolyte membrane composed of a crosslinked ion exchange resin, and
a polymer adhered onto at least one surface of the solid polymer electrolyte membrane in an amount of 0.0001 to 0.5 mg/cm$^2$, which polymer has a charge group of a polarity opposite to that of the ion exchange group of the ion exchange resin and has a weight-average molecular weight of 5,000 to 1,000,000.

[2] The membrane for fuel cell according to [1], wherein the polymer is adhered onto at least one surface of the solid polymer electrolyte membrane in a state that, when the membrane for fuel cell is immersed in a 50 mass % aqueous methanol solution of 30° C., there is substantially no difference in the adhesion amounts of the polymer before and after the immersion.

[3] The membrane for fuel cell according to [2], which is used in a direct methanol fuel cell.

[4] The membrane for fuel cell according to [1], wherein the solid polymer electrolyte membrane is formed by polymerizing a monomer composition containing a bi- or higher functional, crosslinking monomer in an amount of 0.5 to 40 mol % of the total polymerizing monomers.

[5] A membrane-electrode assembly for fuel cell, comprising:
a membrane for fuel cell according to [1] or [2], and
a catalyst electrode layer bonded to the surface of the membrane for fuel cell, which catalyst electrode layer contains an ion exchange resin having the same polarity as the crosslinked ion exchange resin composing the solid polymer electrolyte membrane, and a catalyst substance.

[6] A process for producing a membrane for fuel cell, which comprises contacting at least one surface of a solid polymer electrolyte membrane composed of a crosslinked ion exchange resin, with a solution of a polymer of 5,000 to 1,000,000 in weight-average molecular weight, having a charge group having a polarity opposite to that of the ion exchange group of the ion exchange resin and then conducting drying to adhere, onto the surface of the solid polymer electrolyte membrane, said polymer in an amount of 0.0001 to 0.5 mg/cm$^2$.

[7] A process for producing a membrane for fuel cell, which comprises contacting at least one surface of a solid polymer electrolyte membrane composed of a crosslinked ion exchange resin, with a solution of a polymer of 5,000 to 1,000,000 in weight-average molecular weight, having a charge group having a polarity opposite to that of the ion exchange group of the ion exchange resin, to obtain a solid polymer electrolyte membrane having, on the surface, said polymer having a charge group of opposite polarity, and then washing the solid polymer electrolyte membrane with a solvent capable of dissolving the polymer having a charge group of opposite polarity, to adhere the polymer on the surface of the solid polymer electrolyte membrane in an amount of 0.0001 to 0.5 mg/cm$^2$.

[8] The process according to [7] for production of a membrane used in a direct methanol fuel cell.

The membrane for fuel cell according to the present invention uses a crosslinked ion exchange resin and is superior in dimensional stability, heat resistance and methanol impermeability. The catalyst electrode layer is bonded strongly to the membrane. Therefore, the membrane-catalyst electrode assembly for fuel cell is small in internal resistance, and, when the membrane is used in a fuel cell, the fuel cell is high in output voltage.

Further, the polymer having a charge group of opposite polarity, adhered to the surface of the solid polymer electrolyte membrane forms, at a high ratio, an ion pair with the ion exchange group possessed by the ion exchange resin composing the solid polymer electrolyte membrane and accordingly is fixed strongly to the surface of the solid polymer electrolyte membrane. Therefore, when the polymer-adhered solid polymer electrolyte membrane is placed in a cell and used and when the polymer contacts with an aqueous methanol solution (a fuel) at the fuel chamber side or contacts with a permeated aqueous methanol solution (a permeated fuel) at the oxidizer chamber side, the dissolution or diffusion of the polymer in the fuel or permeated fuel is unlikely to occur. As a result, the poisoning and deactivation of the catalyst of catalyst electrode layer by the dissolved polymer is suppressed greatly. Consequently, when a direct methanol fuel cell or the like is produced using the membrane of the present invention, the fuel cell can maintain a high output voltage over a long period of time.

The membrane for fuel cell according to the present invention maintains the excellent characteristics of crosslinked membrane for fuel cell and yet, when made into a membrane-electrode assembly for fuel cell, its internal resistance (which has been a drawback in conventional membranes) can be set low. Therefore, the membrane for fuel cell according to the present invention is very useful in production of a hydrogen fuel cell, a direct methanol fuel cell, or the like.

BRIEF DESCRIPTION OF THE DRAWINGS

In FIGS. 1, 1a and 1b are each a cell partition wall; 2 is a fuel passage; 3 is an oxidizer gas passage; 4 is a fuel chamber side diffusion electrode; 5 is an oxidizer chamber side gas diffusion electrode; 6 is a solid polymer electrolyte; 7 is a fuel chamber; and 8 is an oxidizer chamber.

BEST MODE FOR CARRYING OUT THE INVENTION

Figure 1:
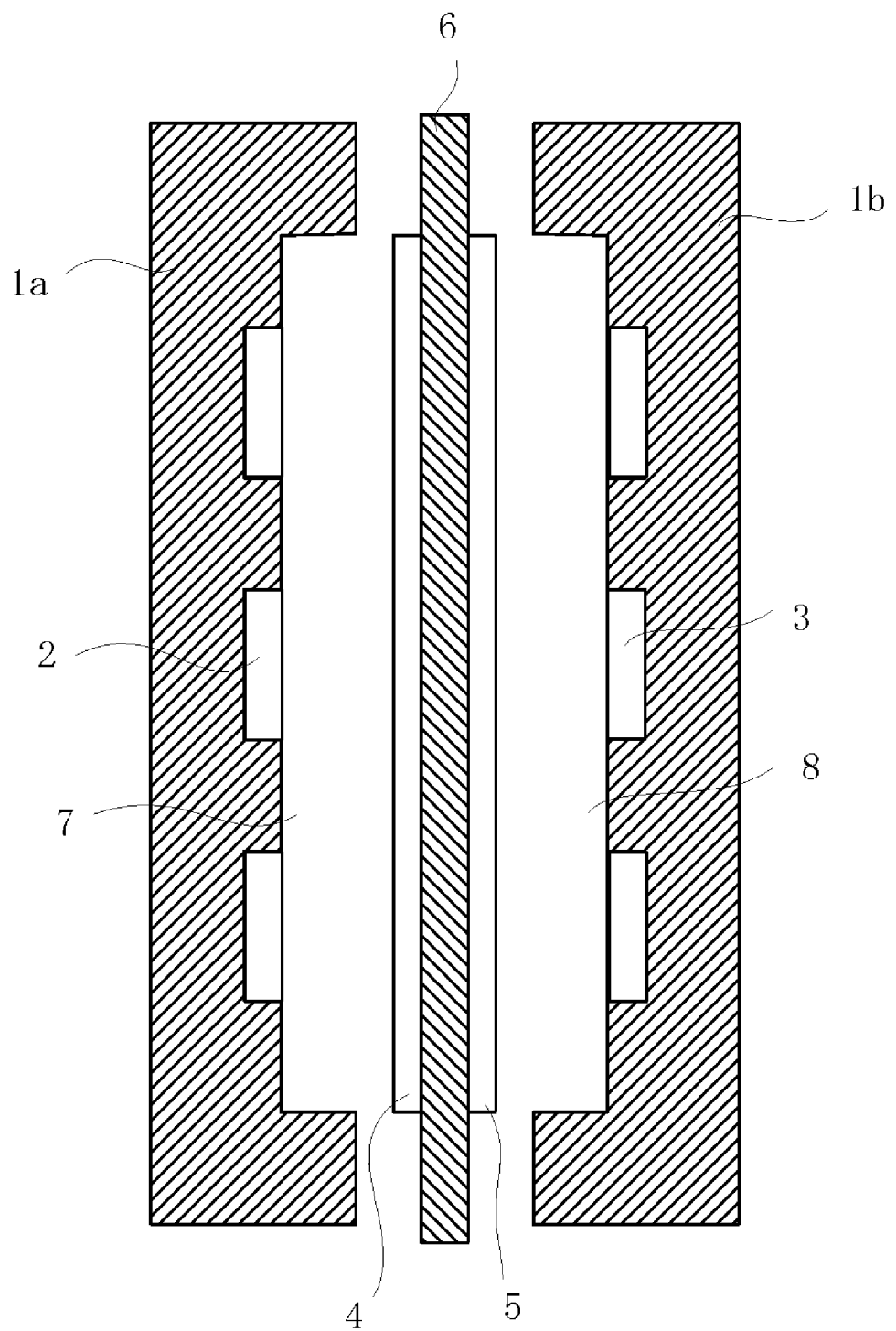
FIG. 1 is a drawing schematically showing the fundamental structure of polymer electrolyte fuel cell.

The membrane for fuel cell, of the present invention comprises a solid polymer electrolyte membrane composed of a crosslinked ion exchange resin, and a polymer adhered onto at least one surface of the solid polymer electrolyte membrane, which polymer has a charge group of a polarity opposite to that of the ion exchange group possessed by the ion exchange resin composing the solid polymer electrolyte membrane (hereinafter, the polymer may be referred to as "opposite polarity polymer"). The opposite polarity polymer has a weight-average molecular weight of 5,000 to 1,000,000. This weight-average molecular weight is far larger than those of polymers having a charge group of opposite polarity, described in the above-mentioned literatures.

Meanwhile, the ion exchange resin used as the solid polymer electrolyte membrane in the present invention is a crosslinked type. When the solid polymer electrolyte membrane is immersed in a solution of the opposite polarity polymer having a large molecular weight, the polymer hardly permeates into the solid polymer electrolyte membrane having a crosslinked, dense structure. Therefore, the opposite polarity polymer is adhered onto the surface of the solid polymer electrolyte membrane at a high density; the opposite polarity polymer and the solid polymer electrolyte membrane form an ionic bond between respective ion exchange groups of opposite polarities; and the opposite polarity polymer and the solid polymer electrolyte membrane are bonded strongly.

When a catalyst electrode layer having the same ion exchange group as the solid polymer electrolyte membrane is bonded to the electrolyte membrane having thereon the opposite polarity polymer adhered, the opposite polarity polymer adhered on the electrolyte membrane at a high density and the catalyst electrode layer form an ionic bond between respective ion exchange groups of opposite polarities, and the opposite polarity polymer and the catalyst electrode layer are bonded strongly.

More detailed explanation is made on this point. The opposite polarity polymer, which is present at a high density between the solid polymer electrolyte membrane and the catalyst electrode layer, has a charge group of polarity opposite to that of the ion exchange group possessed by the solid polymer electrolyte membrane. The charge group of the opposite polarity polymer, which is present in the vicinity of its interface with the solid polymer electrolyte membrane, forms an ionic bond with the ion exchange group possessed by the solid polymer electrolyte membrane.

The catalyst electrode layer contains, for ion conductivity, an ion exchange resin having an ion exchange group of the same polarity as the ion exchange group of the solid polymer electrolyte membrane. Therefore, the portion of the charge group of the opposite polarity polymer, present in the vicinity of its interface with the catalyst electrode layer forms an ionic bond with the ion exchange group possessed by the catalyst electrode layer. As a result, the solid polymer electrolyte membrane and the catalyst electrode layer are strongly bonded to each other by ionic bond via the opposite polarity polymer. Thus, the solid polymer electrolyte membrane and the catalyst electrode layer are bonded not only by ordinary affinity but also by ionic bond, whereby the bonding between them is increased significantly.

The charge group possessed by the opposite polarity polymer needs to have a polarity opposite to that of the ion exchange group of the solid polymer electrolyte membrane. That is, the charge group possessed by the opposite polarity polymer is selected so as to be a cationic group when the ion exchange group of the solid polymer electrolyte membrane is a cation exchange group (i.e. an anionic group) and is selected so as to be an anionic group when the ion exchange group of the solid polymer electrolyte membrane is an anion exchange group (i.e. a cationic group).

Meanwhile, when the charge group of the polymer and the ion exchange group of the solid polymer electrolyte membrane have the same polarity, no ionic bond is formed between the solid polymer electrolyte membrane and the polymer adhered thereon. Rather, the bonding strength between them is reduced by the repulsion between the charges of same polarity. As a result, there is no increase in bonding strength between them.

Incidentally, the polarity of the ion exchange group possessed by the solid polymer electrolyte membrane, when the solid polymer electrolyte membrane has two kinds of ion exchange groups of different polarities, refers to the polarity of the ion exchange group occupying more than 50% of the total ion exchange groups.

As the charge group possessed by the opposite polarity polymer, there can be used those known as the ion exchange group of ion exchange resin, with no restriction, as in the case of the solid polymer electrolyte membrane described later. There can be specifically mentioned, as the cation exchange group, sulfonic acid group, carboxylic acid group, phosphonic acid group, etc. and, as the anion exchange group, primary to tertiary amino groups, quaternary ammonium group, pyridyl group, imidazole group, quaternary pyridinium group, quaternary imidazolium group, etc. These ion exchange groups may be used singly or in combination of two or more kinds. Further, combination use of a cation exchange group and an anion exchange group is possible. In this case, of the cation and anion exchange groups possessed by the opposite polarity polymer, the polarity of the ion exchange group occupying more than 50% of the total ion exchange groups is taken as the polarity of the opposite polarity polymer.

The ion exchange group possessed by the solid polymer electrolyte membrane described later is preferably a cation exchange group. Therefore, the charge group of the opposite polarity polymer is preferably an anion exchange group. Particularly, primary to tertiary amino groups, pyridyl group and imidazole group are preferred and pyridyl group is most preferred because, even when there is present other ion outside the membrane, the ionic bond between the ion exchange group of membrane and the charge group of opposite polarity polymer is not cut by the other ion and the ionic bond can be kept.

The amount of the opposite polarity polymer adhered onto the surface of the solid polymer electrolyte membrane is 0.0001 to 0.5 mg/cm$^2$. The adhesion amount can be controlled by the concentration of the opposite polarity polymer solution used in the adhesion step, the contact time, etc.

The amount of the opposite polarity polymer adhered onto the surface of the solid polymer electrolyte membrane can be determined by the following method when the adhesion amount is 0.001 to 0.5 mg/cm$^2$.

First, the electrolyte membrane is placed on both sides of a germanium optical crystal, to prepare a sample. Then, the angle of an infrared radiation incident on the electrolyte membrane on the sample is set at 45°, and there is measured the multiple reflection infrared spectrum of the sample by attenuated total reflection absorption spectroscopy. From the spectrum obtained, there is determined the characteristic absorption intensity based on the ion exchange group possessed by the opposite polarity polymer.

Meanwhile, the opposite polarity polymer of known amount is coated on a polyethylene terephthalate film, and there is measured the absorption intensity of spectrum in the same manner. Using this data, there is prepared a calibration curve between the amount of opposite polarity polymer and the absorption intensity of spectrum. Using this calibration curve, there is calculated the adhesion amount [per unit area (cm$^2$)] of opposite polarity polymer corresponding to the obtained absorption intensity of the sample (hereinafter, this measurement method is called "ATR method").

In this method, there is used, as the germanium optical crystal, ordinarily a crystal of 20 mm×50 mm×3 mm. As the solid polymer electrolyte membrane used in the measurement, there is used one having an area of 10 mm×45 mm.

Here, the characteristic absorption based on the ion exchange group possessed by the opposite polarity polymer, indicates, when the opposite polarity polymer has a pyridyl group of, for example, poly (4-vinylpyridine), a characteristic absorption of the pyridyl group having an absorption in the vicinity of 1636 to 1644 cm$^{-1}$ and, when the opposite polarity polymer has an imine group of, for example, polyethyleneimine, a characteristic absorption of the imine group having an absorption in the vicinity of 1637 to 1645 cm$^{-1}$.

In the above method, the infrared radiation used in the measurement does not permeate from around the surface layer of the solid polymer electrolyte membrane deep into the inside thereof. Accordingly, the above method enables accurate measurement of the opposite polarity polymer present in the vicinity of the surface of the solid polymer electrolyte membrane. That is, the substantial amount of the opposite polarity polymer adhered to the surface of the membrane can be obtained.

The amount of the opposite polarity polymer adhered to the surface of the solid polymer electrolyte membrane is not always uniform and differs depending upon the position of the surface. However, the small variation in the amount adhered to the surface hardly affects the measurement result as long as there is used a germanium optical crystal having an area such as mentioned above and, as a measurement sample, a solid polymer electrolyte membrane having a size such as mentioned above.

The measurement of the adhesion amount of the opposite polarity polymer can also be conducted by a method other than the above ATR method, by immersing a membrane for fuel cell according to the present invention in an equal-mass mixed solution consisting of a 0.5 mol/l aqueous sodium hydroxide solution and methanol, for a long time, to completely dissolve, in the mixed solution, an opposite polarity polymer which is adhered to the surface of the membrane and which may further be present inside the membrane, and quantitatively determining the amount of the polymer dissolved, by liquid chromatography or the like (this measurement method is hereinafter referred to as "solvent immersion method"). The value obtained by dividing the mass of the opposite polarity polymer determined, by the total area ($cm^2$) of the membrane is the sum of the adhesion amount at the surface (the amount obtained by the ATR method) and the amount of the opposite polarity polymer present inside the membrane; however, it has been confirmed that the value obtained by this method is ordinarily about the same as the adhesion amount obtained by the ATR method. From this, it has been confirmed that, when an opposite polarity polymer of large molecular weight is adhered to a crosslinked, ion exchange membrane, the opposite polarity polymer hardly permeates into the electrolyte membrane and the most part of the polymer adheres to the surface of the membrane.

In the ATR method, the accuracy of measurement of adhesion amount is low when the adhesion amount of the opposite polarity polymer is less than 0.001 $mg/cm^2$. Therefore, when the adhesion amount is less than 0.001 $mg/cm^2$ but not less than 0.0001 $mg/cm^2$, the adhesion amount at the surface is determined by the following method which is an application method of the above solvent immersion method.

First, the solvent immersion method is conducted for a membrane for fuel cell, of the present invention, to determine the adhesion amount of opposite polarity polymer measured by this method. As described above, in the membrane for fuel cell, of the present invention, the opposite polarity polymer hardly permeates into the membrane and the most part thereof adheres to the surface of the membrane. Therefore, the amount of the opposite polarity polymer determined by the solvent immersion method is very close to the adhesion amount at the membrane surface; however, in the method which is an application method of the solvent immersion method, a more accurate adhesion amount at the surface can be determined by determining even the substantial amount of the opposite polarity polymer which has permeated into the membrane, according to the following method and then subtracting the substantial amount from the adhesion amount obtained by the solvent immersion method.

That is, the surface layer portion of the membrane for fuel cell prepared in the same manner as above is scraped off by a thickness of 1 μm by a sand blast treatment. Using the thus-obtained membrane for fuel cell whose surface layer portion has been scraped off, the solvent immersion method is conducted again to determine the polymer amount, whereby is determined the substantial amount of the opposite polarity polymer which has permeated into the membrane for fuel cell whose surface layer portion has been scraped off. Incidentally, in the ATR method, the depth in which the infrared radiation used in the measurement permeates into the surface layer of the solid polymer electrolyte membrane, is estimated to be generally about 0.4 μm; therefore, by scraping off the surface layer portion of the membrane for fuel cell by 1 μm, the portion of the membrane used for measurement of the surface adhesion amount of opposite polarity polymer by the ATR method can be removed.

By subtracting, from the amount of the opposite polarity polymer before scraping-off of the surface layer portion of the membrane for fuel cell, the amount of the opposite polarity polymer after scraping-off of the surface layer portion, there can be accurately measured the amount of the opposite polarity polymer adhered to the surface of the membrane for fuel cell, of the present invention.

In this method, there is ordinarily used, as the membrane used for dissolution of opposite polarity polymer, a size of 8 cm×8 cm. In this case as well, even if there is a variation in the amount of opposite polarity polymer adhered to the surface of membrane, the variation hardly affects the result of measurement as long as there is used a membrane having an area such as mentioned above.

Incidentally, the amount of the opposite polarity polymer adhered to the surface of the solid polymer electrolyte membrane may be determined by a method other than the above-mentioned methods. That is, any method can be used as long as it has a correlation to the above-mentioned methods and substantially the same measurement value is obtained.

When the amount of the opposite polarity polymer adhered to the surface of the solid polymer electrolyte membrane is less than 0.0001 $mg/cm^2$, the amount of the polymer capable of taking part in ionic bonding is insufficient, making insufficient the bonding between the electrolyte membrane and the catalyst electrode layer. An adhesion amount of the opposite polarity polymer of more than 0.5 $mg/cm^2$ is not preferred because the electrical resistance of the thin film portion constituted by the opposite polarity polymer is striking as compared with the electrical resistance of the electrolyte membrane, etc. The adhesion amount of the opposite polarity polymer is preferably 0.0003 to 0.3 $mg/cm^2$, more preferably 0.001 to 0.1 $mg/cm^2$.

The weight-average molecular weight of the opposite polarity polymer is 5,000 to 1,000,000.

When the weight-average molecular weight is less than 5,000, the opposite polarity polymer permeates easily into the solid polymer electrolyte membrane in the step of adhering the opposite polarity polymer to the solid polymer electrolyte membrane. As a result, the proportion of the opposite polarity polymer adhering to the surface of the solid polymer electrolyte membrane reduces. That is, the density of the charge group possessed by the opposite polarity polymer, at the surface of the electrolyte membrane reduces. Consequently, there reduces the density of the ionic bonding between the ion exchange group possessed by the ion exchange resin present in the catalyst electrode layer and the charge group possessed by the opposite polarity polymer, making insufficient the bonding between the electrolyte membrane and the catalyst electrode layer. The weight-average molecular weight of the opposite polarity polymer is preferably 30,000 or more, more preferably 100,000 or more, in order to prevent the permeation of opposite polarity polymer into electrolyte membrane and obtain stronger bonding.

When the weight-average molecular weight of the opposite polarity polymer is more than 1,000,000, the dissolution of opposite polarity polymer in solvent is difficult in the step of adhering the opposite polarity polymer to the solid polymer electrolyte membrane. In order to obtain a uniform solution of the opposite polarity polymer, the upper limit of the weight-average molecular weight of the opposite polarity polymer is preferably 300,000, more preferably 250,000.

As to the form in which the opposite polarity polymer is adhered to the surface of the solid polymer electrolyte membrane, there is no particular restriction.

For example, the opposite polarity polymer may be formed in a thin film layer so as to cover the whole part of one surface side of the solid polymer electrolyte membrane. Or, the thin film layer may be formed on part of one surface side of the solid polymer electrolyte membrane. When the opposite polarity polymer is adhered only to part of the surface of the solid polymer electrolyte membrane, the adhesion area of the opposite polarity polymer is preferably at least ½ of each surface side of the solid polymer electrolyte membrane in order to make sufficient the bonding between the electrolyte membrane and the catalyst electrode layer.

Incidentally, when the opposite polarity polymer is adhered to part of the surface of the electrolyte membrane, the adhesion amount of the opposite polarity polymer is defined based on the adhesion area of the opposite polarity polymer adhered.

As specific examples of the opposite polarity polymer used in the present invention, there can be mentioned, in the case of the opposite polarity polymer having a cation exchange group, perfluorocarbonsulfonic acids such as Nafion (trade name) produced by DuPont and the like; sulfonation products or alkylsulfonation products of engineering plastics such as polyetheretherketone, polysulfone, polyethersulfone, polybenzimidazole, polyvinylimidazole, polyoxazole, polyphenylene oxide, polyphenylene sulfide and the like; sulfonation products of elastomers such as polystyrene-poly(ethylene-butylene)-polystyrene triblock copolymer, polystyrene-poly(ethylene-propylene)-polystyrene triblock copolymer and the like; polystyrenesulfonic acid; and derivatives thereof.

In the case of the opposite polarity polymer having an anion exchange group, there can be mentioned poly(4-vinylpyrdine), poly(2-vinylpyridine), polyethyleneimine, polyallylamine, polyaniline, polydiethylaminoethylstyrene, polyvinylimidazole, polybenzimidazole, polydimethylaminoethyl methacrylate, alkylation product of chloromethylated polystyrene, derivatives thereof, and products obtained by completely or partially quaternarizing the nitrogen atom of the above products. Of these opposite polarity polymers, preferred are polymers having an anion exchange group; particularly preferred are polymers having tertiary nitrogen, such as poly(4-vinylpyridine), poly(2-vinylpyridine), polyethyleneimine, polyallylamine, polyaniline, polyvinylimidazole, polybenzimidazole and the like; more preferred are polyvinylpyridines such as poly(4-vinylpyridine), poly(2-vinylpyridine) and the like.

Next, description is made on the solid polymer electrolyte membrane used in the present invention.

As the ion exchange resin constituting the solid polymer electrolyte membrane, there is used a crosslinked, ion exchange resin. The membrane for fuel cell, obtained by using a crosslinked ion exchange resin is superior in properties such as dimensional stability, heat resistance, mechanical strength, methanol impermeability and the like. Further, the membrane prevents the permeation of opposite polarity polymer into electrolyte membrane, preventing a reduction in the adhesion amount of opposite polarity polymer at the surface of electrolyte membrane.

As such an ion exchange resin, there can be used any known, crosslinked, ion exchange resin having an ion exchange group, and there is no particular restriction.

As specific examples of an ion exchange group of ion exchange resin, there can be mentioned, in the case of the cation exchange resin, sulfonic acid group, carboxylic acid group and phosphonic acid group. In the case of the anion exchange group, there can be mentioned primary to tertiary amino groups, quaternary ammonium group, pyridyl group, imidazole group, quaternary pyridinium group and quaternary imidazolium group. These ion exchange groups may be used singly or in combination of two or more kinds. Further, a cation exchange group and an anion exchange group may be used in combination.

The ion exchange resin is preferably an ion exchange resin having a cation exchange group, because it is used as a membrane for fuel cell. Since the cation exchange resin has high ion conductivity, a proton-conductive type fuel cell is currently a main stream. The cation exchange group is preferably a sulfonic acid group which is a strongly acidic group. When the ion exchange resin is used in a direct methanol fuel cell, the ion exchange resin is preferred to have a cation exchange group and an anion exchange group in combination, in order to suppress the cross-over of methanol or water. Particularly preferred is an ion exchange resin having a sulfonic acid group and a primary to tertiary amino group, a pyridyl group or an imidazole group, in combination. In this case, the ratio of the cation exchange group and the anion exchange group is 1:0.95 to 1:0.1 in terms of molar ratio.

As to the structure of the portion of ion exchange resin other than ion exchange group (this portion may be hereinafter referred to as resin skeletal portion), there is no particular restriction except that the structure is a crosslinked structure. As long as this requirement is met, the ion exchange resin may be, for example, a fluorine-based resin wherein hydrogen atom is replaced by fluorine atom. Highly fluorinated, fluorine-based resins typified by the above-mentioned perfluorocarbonsulfonic acid membrane, are non-crosslinked. Therefore, there is ordinarily used a so-called hydrocarbon type resin whose hydrogen atom is not replaced by fluorine atom.

As specific examples of the resin skeletal portion, there can be mentioned resins of polystyrene type, polyacrylic type, polyamide type, polyether type, polyethersulfone type, etc. In these resins, carbon-carbon bond is mainly used for constitution of the main chain; therefore, these resins are superior in chemical stability of main chain. Of these resins, particularly preferred are those having a polystyrene type skeleton, because they allow easy introduction of various ion exchange groups and are made of inexpensive raw materials.

The crosslinking density of the resin skeletal portion needs to be such that, in coating an opposite polarity polymer solution on an ion exchange resin membrane produced from the above-mentioned hydrocarbon type resin, it can substantially prevent the permeation of the opposite polarity polymer into the resin membrane. By allowing the resin skeletal portion to have such a crosslinking density, the opposite polarity polymer, when coated on the surface of the resin membrane, can be adhered to the surface of the resin membrane in a significant amount and kept thereon.

When a polymerizing monomer having an ion exchange group, or a polymerizing monomer into which an ion exchange group can be introduced, is copolymerized with a bi- or higher functional, crosslinking monomer to produce a resin membrane, the amount of the crosslinking monomer is preferably 0.5 to 40 mole %, more preferably 3.0 to 30 mole % of the total polymerizing monomers.

In the crosslinked ion exchange resin, each of the ion exchange group, the resin skeletal portion, the crosslinked structure, etc. may be a combination of a plurality of different kinds. Further, the crosslinked ion exchange resin may be compounded together with a non-crosslinked ion exchange resin as long as various properties intended by the present invention are not impaired.

The method for formation of the crosslinked ion exchange resin membrane includes, for example, casting of the crosslinked ion exchange resin. A more preferred method is a method of using a substrate (this is referred to also as reinforcing material) as described below. By using a substrate, the mechanical strength and dimensional stability of resin membrane can be enhanced and, moreover, flexibility can be imparted.

As the substrate used in the method of using a substrate, there can be used any substrate known as the substrate for ion exchange membrane. A porous film, a non-woven paper, a woven cloth, a non-woven cloth, a paper, an inorganic membrane, etc. can be used with no restriction. As the material for substrate, there can be mentioned, for example, a thermoplastic resin composition, a thermosetting resin composition, an inorganic material, and a mixture thereof. Of these substrates, a substrate produced with a thermoplastic resin composition is preferred because it is easy to produce and shows a high adhesion strength to hydrocarbon-based ion exchange resin.

As examples of the thermoplastic resin composition, there can be mentioned polyolefin resins, for example, homopolymers or copolymers of α-olefins such as ethylene, propylene, 1-butene, 1-pentene, 1-hexene, 3-methyl-1-butene, 4-methyl-1-pentene, 5-methyl-1-heptene and the like; vinyl chloride resins such as polyvinyl chloride, vinyl chloride-vinyl acetate copolymer, vinyl chloride-vinylidene chloride copolymer, vinyl chloride-olefin copolymer and the like; fluoroplastics such as polytetrafluoroethylene, polychlorotrifluoroethylene, polyvinylidene fluoride, tetrafluoroethylene-hexafluoropropylene copolymer, tetrafluoroethylene-perfluoroalkyl vinyl ether copolymer, tetrafluoroethylene-ethylene copolymer and the like; polyamide resins such as nylon 6, nylon 66 and the like; and polyimide resins.

Of these thermoplastic resin compositions, polyolefin resins are preferred because they are superior in mechanical strength, chemical stability and chemical resistance and have very good compatibility with hydrocarbon-based ion exchange resins. Of the polyolefin resins, polyethylene or polyproylene resin is particularly preferred and polyethylene resin is most preferred.

Further, a porous film made of a polyolefin resin is preferred because it has a smooth surface, good adhesivity with catalyst electrode layer and a high strength. A porous film made of a polyethylene resin is preferred particularly.

The average pore diameter of the porous film used as a substrate for ion exchange membrane is preferably 0.005 to 5.0 μm, more preferably 0.01 to 2.0 μm. The porosity of the porous film is preferably 20 to 95%, more preferably 30 to 90%. The gas permeability (JIS P 8117) is preferably 1,500 sec or less, more preferably 1,000 sec or less. The thickness is preferably 5 to 150 μm, more preferably 10 to 120 μm, particularly preferably 15 to 50 μm. By using a porous film of such a thickness, there can be obtained an ion exchange membrane which is thin and yet has a sufficient strength.

The above porous film can be obtained by methods described in JP-A-1997-216964, JP-A-1997-235399, JP-A-2002-338721, etc. Or, it is available as commercial products (for example, Hipore of Asahi Chemical Industry Co, Ltd., U-pore of Ube Industries, ltd., Setera of Tonen Tapils Co., Ltd., and Excelpor of Nitto Denko Corporation).

The solid polymer electrolyte membrane used in the present invention may contain other components such as plasticizer, inorganic filler and the like as long as the advantages of the present invention are not impaired thereby.

The solid polymer electrolyte membrane used in the present invention may be produced by any method. However, it is generally produced preferably by the following method.

In the method, first, the pore portions of the above-mentioned substrate are impregnated with a monomer composition containing a polymerizing monomer which has an ion exchange group or into which an ion exchange group can be introduced, and a bi- or higher functional crosslinking monomer; then, the monomer composition is polymerized; thereafter, as necessary, an ion exchange group is introduced.

As specific examples of the polymerizing monomer which has an ion exchange group or into which an ion exchange group can be introduced and which is contained in the monomer composition, there can be mentioned mono-functional aromatic vinyl compounds such as styrene, α-methylstyrene, vinyltoluene, 2,4-dimethylstyrene, p-tert-butylstyrene, α-halogenated styrene, chloromethylstyrene, vinylnaphthalene, vinylpyridine, vinylimidazole, styrenesulfonic acid and the like; mono-functional (meth)acrylic acid and derivatives thereof, such as (meth)acrylic acid, methyl (meth)acrylate, (meth)acrylamide-2-methylpropanesulfonic acid and the like; and other vinyl compounds such as vinylsulfonic acid, maleic acid anhydride and the like. Of these compounds, preferred are mono-functional aromatic vinyl compounds such as styrene, α-methylstyrene, vinyltoluene, 2,4-dimethylstyrene, p-tert-butylstyrene, α-halogenated styrene, vinylnaphthalene and the like because it is easy to introduce into them a sulfonic acid group which is a strongly acidic group; most preferred is styrene because styrene can allow the resulting ion exchange membrane to have an ion exchange group at a higher density.

As the bi- or higher functional crosslinking monomer, there is generally used a bi- to tri-functional crosslinking monomer. As specific examples, there can be mentioned poly-functional aromatic vinyl compounds such as divinylbenzene, divinylbiphenyl, trivinylbenzene and the like; poly-functional (meth)acrylic acid derivatives such as trimethylolmethane-trimethacrylic acid ester, methylenebisacrylamide, hexamethylenedimethacrylamide and the like; and other poly-functional polymerizable monomers such as butadiene, chloroprene, divinylsulfone and the like. Of these, preferred are poly-functional aromatic vinyl compounds such as divinylbenzene, divinylbiphenyl, trivinylbenzene and the like.

The monomer composition is preferred to contain a polymerization initiator in order to polymerize the polymerizing monomer. Any polymerization initiator which can polymerize the polymerizing monomer, can be used with no restriction. Specifically, there can be mentioned organic peroxides such as octanoyl peroxide, lauroyl peroxide, tert-butyl peroxy-2-ethylhexanoate, benzoyl peroxide, tert-butyl peroxyisobutyrate, tert-butyl peroxylaurate, tert-hexyl peroxybenzoate, di-tert-butyl peroxide and the like. The amount of the polymerization initiator used may be a known range ordinarily used in polymerization of polymerizing monomer. It is generally 0.01 to 10 parts by mass relative to 100 parts by mass of the total polymerizing monomers.

The monomer composition may contain a solvent as necessary and may further contain known additives such as plasticizer, organic or inorganic filler and the like. Addition of, in particular, non-conductive particles such as lamellar silicate or the like into the monomer composition is preferred in order to increase methanol impermeability. The lamellar silicate has the average longest diameter (of primary particles) which is at least 0.1 time the average pore diameter of substrate and not more than 50 μm, and is described in Japanese Patent Application 2003-377454.

Next, in production of the solid polymer electrolyte membrane used in the present invention, the monomer composition is contacted with a substrate. As the method for contact, there can be mentioned, for example, a method of coating or spraying the monomer composition on a substrate, or a method of immersing the substrate in the monomer composition. The immersion method is particularly preferred because it makes easy the production of solid polymer electrolyte membrane. The time of immersion differs depending upon the kind of substrate or the composition of monomer composition but is generally 0.1 sec to ten and several minutes.

In polymerizing the monomer composition, a known polymerization method can be used with no restriction. There is generally used a method of heat-polymerizing a monomer composition containing a polymerization initiator (the above-mentioned peroxide). This method is preferred because it is easy to operate and can polymerize the monomer composition relatively uniformly. The polymerization is preferably conducted in a state that the surface of the substrate has been covered with a film of polyester or the like. By covering the substrate surface with a film, hindrance of polymerization by oxygen can be prevented and the surface of the resulting electrolyte membrane can be made smooth. Also, by covering the substrate surface with a film, an excessive amount of the monomer composition is removed and a thin, uniform, solid polymer electrolyte membrane can be obtained.

In the case of heat polymerization, the polymerization temperature is not restricted and a known condition may be selected appropriately. The temperature is generally about 50 to 150° C., preferably about 60 to 120° C. Incidentally, when the monomer composition contains a solvent, the solvent may be removed before polymerization.

A filmy material is obtained by the polymerization according to the above method. When, in production of the filmy material, there is used, as the polymerizing monomer, a polymerizing monomer having an ion exchange group, the filmy material obtained is not subjected to any further treatment and is used per se as a solid polymer electrolyte membrane. When there is used, as the polymerizing monomer, a polymerizing monomer into which an ion exchange group can be introduced, an ion exchange group is introduced into the filmy material obtained.

There is no particular restriction as to the method for introduction of ion exchange group, and a known method can be selected appropriately. For example, when styrene is used as a main polymerizing monomer, the filmy material is contacted with sulfur trioxide, chlorosulfonic acid, fuming sulfuric acid, concentrated sulfuric acid or the like and then hydrolysis is conducted as necessary, whereby a sulfonic acid group can be introduced into the filmy material.

When there is used a methacrylic acid ester as the polymerizing monomer, the ester portion is hydrolyzed, whereby a carboxylic acid group can be introduced. Even when there is used, as the polymerizing monomer, a polymerizing monomer having an ion exchange group, it is possible to further introduce, into the filmy material obtained, an ion exchange group as necessary, for a higher density of ion exchange group.

In the solid polymer electrolyte membrane of the present invention obtained by the above method, the membrane resistance in a 3 mol/l aqueous sulfuric acid solution differs depending upon the monomer composition, ion exchange group and kind of substrate used but is ordinarily 0.005 to $0.6\Omega \cdot cm^2$, preferably 0.01 to 0.5 $\Omega cm^2$. To achieve a membrane resistance of less than $0.005\Omega \cdot cm^2$ is actually difficult. A membrane resistance of larger than 0.6 $\Omega cm^2$ is too large and use of the a membrane having such a resistance for fuel cell is disadvantageous.

In order to control the membrane resistance in the above range, it is preferred to control the ion exchange capacity at 0.2 to 5 mmol/g, more suitably at 0.5 to 3 mmol/g.

The water content of the solid polymer electrolyte membrane is preferably 7% or more, more preferably 10% or more so that there occurs no reduction in proton conductivity caused by drying. The water content is generally kept at about 7 to 90%. In order for the water content to be in this range, there are controlled the kind of ion exchange group, the capacity of ion exchange, the degree of crosslinking, etc.

The thickness of the solid polymer electrolyte membrane is generally desired to be preferably 5 to 150 µm, more preferably 10 to 90 µm for lower membrane resistance as well as for mechanical strength required for supporting membrane.

The burst strength of the solid polymer electrolyte membrane is preferably 0.08 to 1.0 MPa. When the burst strength is less than 0.08 MPa, the membrane is inferior in mechanical strength; therefore, when the solid polymer electrolyte membrane is integrated into a fuel cell, there are cases that, in the solid polymer electrolyte membrane, there arise cracking or pinholes caused by the fiber of carbon paper ordinarily used as a gas diffusion electrode. The burst strength is more preferably 0.1 MPa or more in order to ensure stable operation of fuel cell over a long period. In general, it is possible to produce a solid polymer electrolyte membrane having a burst strength of up to 1.0 MPa which is an upper limit.

There is no particular restriction as to the method for adhering the opposite polarity polymer to the surface of the solid polymer electrolyte membrane. There is, for example, a method of coating a solution of an opposite polarity polymer on a polytetrafluoroethylene sheet, followed by drying, to form a thin film of the opposite polarity polymer on the sheet, and then transferring the thin film formed on the sheet, onto a solid polymer electrolyte membrane by hot-pressing or the like. There is also a method of plasma-polymerizing a monomer to deposit an opposite polarity polymer on the surface of a solid polymer electrolyte membrane. However, the following method is preferred in view of the easiness of the method and the bonding strength of catalyst electrode layer to membrane for fuel cell.

It is a method of contacting a solution of an opposite polarity polymer with at least one surface of the solid polymer electrolyte membrane, followed by drying, to adhere the opposite polarity polymer to the surface of the solid polymer electrolyte membrane in an amount of 0.0001 to 0.5 mg/cm$^2$.

In this method, there is no particular restriction as to the solvent in which the opposite polarity polymer is dissolved. The solvent may be appropriately selected depending upon the weight-average molecular weight and chemical structure of the opposite polarity polymer dissolved. Specifically, there can be mentioned alcohols such as methanol, ethanol, 1-butanol, 2-ethoxyethanol and the like; aliphatic hydrocarbons such as hexane, cyclohexane, heptane, 1-octane and the like; fatty acids such as octanoic acid and the like; amines such as dimethyloctylamine and the like; aromatic hydrocarbons such as toluene, xylene, naphthalene and the like; ketones such as acetone, cyclohexanone, methyl ethyl ketone and the like; ethers such as dibenzyl ether, diethylene glycol dimethyl ether and the like; halogenated hydrocarbons such as methylene chloride, chloroform, ethylene bromide and the like; alcohol esters or alkylphosphoric acid esters of aromatic acids or aliphatic acids, such as dimethyl phthalate, dioctyl phthalate, dimethyl isophthalate, dibutyl adipate, triethyl citrate, acetyl tributyl citrate, dibutyl sebacate and the like; and water.

As to the concentration of the opposite polarity polymer in the opposite polarity polymer solution, there is no particular restriction. However, the concentration is preferably 0.005 to 8% by mass, more preferably 0.02 to 2% by mass, further preferably 0.05 to 1% by mass. When the concentration is less than 0.005% by mass, a long time is taken for adhesion of the opposite polarity polymer to the solid polymer electrolyte membrane in a required amount. Further, there is a case that the adhesion amount is insufficient, making insufficient the bonding strength of the membrane-electrode assembly for fuel cell, obtained. When the concentration is more than 8% by mass, the opposite polarity polymer adheres to the solid polymer electrolyte membrane in an amount more than required and the resistance of the membrane-electrode assembly for fuel cell, obtained tends to be high. Further, since the opposite polarity polymer adheres to the surface of the solid polymer electrolyte membrane in an amount more than required, the resistance of the membrane-electrode assembly for fuel cell, obtained is high, which is not preferred. Further, when the membrane for fuel cell is immersed in, for example, an aqueous methanol solution (mentioned later) in order to remove the opposite polarity polymer adhered in excess, it is difficult, even if such a treatment is conducted, to make substantially zero the difference in adhesion amounts of opposite polarity polymer before and after the immersion of membrane in aqueous methanol solution.

In the above method for adhesion of opposite polarity polymer, then, the opposite polarity polymer solution is contacted with the solid polymer electrolyte membrane. There is no particular restriction, either, as to the method for contact. There is, for example, a method of coating or spraying the opposite polarity polymer solution on the solid polymer electrolyte membrane, or a method of immersing the solid polymer electrolyte membrane in the opposite polarity polymer solution. The immersion method is particularly preferred because it allows for easy production. When the contact is made by immersion, the immersion time differs depending upon the kinds of solid polymer electrolyte membrane and opposite polarity polymer and the concentration and solvent of opposite polarity polymer solution, but is generally 1 minute to 24 hours. The immersion is conducted preferably for 5 minutes or more so that the ion exchange group of electrolyte membrane and the charge group of opposite polarity polymer form ionic bonding and the opposite polarity polymer adheres strongly onto the electrolyte membrane. Also, the immersion time is preferred not to exceed 15 hours in order to avoid adhesion of opposite polarity polymer to electrolyte membrane in an amount more than required and consequent high resistance of membrane-electrode assembly for fuel cell obtained and further avoid adhesion of opposite polarity polymer to electrolyte membrane in an amount more than required and consequent difference in adhesion amounts before and after immersion in aqueous methanol solution (mentioned later).

Then, the solid polymer electrolyte membrane is taken out of the opposite polarity polymer solution and, as necessary, dried to remove the remaining solvent. When the solvent used for dissolving the opposite polarity polymer is a solvent of high dielectric constant or the solubility of opposite polarity polymer in solvent is high, the formation of ion pair between the ion exchange group of electrolyte membrane and the charge group of opposite polarity polymer may be insufficient. In such a case, the above-mentioned drying of electrolyte membrane can promote formation of ion pair.

There is no particular restriction as to the method for drying. The drying is made at 0 to 100° C. for 1 minute to 5 hours depending upon the concentration and solvent of the opposite polarity polymer solution used. For sufficient drying, hot-air spraying or drying under reduced pressure may be used; or, drying may be conducted in an inert atmosphere such as argon, nitrogen or the like. The drying is preferably conducted with a tension being applied to the membrane for fuel cell by, for example, fixing the membrane to a frame. This drying can avoid non-uniform removal of solvent and consequent non-uniform adhesion of opposite polarity polymer to the surface of electrolyte membrane.

As above, the membrane for fuel cell, of the present invention can be obtained. The membrane for fuel cell is suitable for use as a membrane of a hydrogen type fuel cell or a direct methanol fuel cell. However, there is a case that, depending upon the kind of the opposite polarity polymer used or the concentration of the opposite polarity polymer solution used, the opposite polarity polymer adheres to the solid polymer electrolyte membrane in an amount more than required and consequently the membrane-electrode assembly for fuel cell obtained has a high resistance.

Further, it is probable that the opposite polarity polymer adhered by the above-mentioned adhesion method contains an opposite polarity polymer fraction adhered to the electrolyte membrane with forming no ion pair. When there is present an opposite polarity polymer fraction which forms no ion pair with the ion exchange group of solid polymer electrolyte membrane and when such an electrolyte membrane is used as a membrane for direct methanol fuel cell, the opposite polarity polymer fraction may poison the electrode catalyst and may reduce the output of fuel cell.

In order to solve this problem, it is preferred to wash the obtained membrane for fuel cell, with a solvent.

As to the solvent used for washing, there is no particular restriction as long as it can dissolve the opposite polarity polymer adhered. The solvent is appropriately selected depending upon the weight-average molecular weight and chemical structure of the opposite polarity polymer adhered. Specifically, there can be used the solvent used in preparation of an opposite polarity polymer solution in the adhesion step.

As to the method for washing, there is no particular restriction. However, there is preferred, for simple operation, a method of immersing the solid polymer electrolyte membrane to which the opposite polarity polymer has been adhered, in the above-mentioned organic solvent, to conduct washing.

As to the condition for washing by immersion, there is no particular restriction. Immersion in solvent is preferably conducted at 0 to 100° C. for 10 minutes to 10 hours. It is effective for higher washing efficiency to conduct immersion 2 to 5 times each time with a fresh solvent. In this case, there is used a total immersion time of 10 minutes to 10 hours.

Then, the solid polymer electrolyte membrane is taken out from the solvent used for washing and dried to remove the solvent in the membrane. As to the method for drying, there is no particular restriction as long as there remains substantially no solvent in the membrane for fuel cell, obtained. The condition for drying is selected in a range of 0 to 100° C. and 1 minute to 5 hours, depending upon the kind of the solvent used for washing. For sufficient drying, there may be conducted spraying of hot air or the like to the electrolyte membrane, or drying under reduced pressure. Also, drying may be conducted in an inert atmosphere such as argon, nitrogen or the like. In order to prevent non-uniform removal of solvent and consequent strain appearance in membrane for fuel cell, drying is preferably conducted with a tension being applied to the electrolyte membrane, for example, by fixing the electrolyte membrane to a frame.

In the present invention, it is preferred that the solid polymer electrolyte membrane to which the opposite polarity polymer has been adhered, is washed by the above-mentioned washing method to remove, from the electrolyte membrane, a free opposite polarity polymer having no ionic bonding with the electrolyte membrane. By this washing operation, there can be obtained an electrolyte membrane to which an opposite polarity polymer is adhered in a state that, when the polymer-adhered electrolyte membrane is immersed in a 50 mass % aqueous methanol solution of 30° C., there is substantially no difference in the adhesion amounts of the polymer before and after the immersion.

Incidentally, in the present invention, "the state that, when the opposite polarity polymer-adhered electrolyte membrane is immersed in an aqueous methanol solution of the above temperature and the above concentration, there is substantially no difference in the adhesion amounts of the polymer before and after the immersion" includes a case in which there is no change in adhesion amounts before and after immersion, a case in which there is a change in a range of measurement error, and a case in which there is a reduction in such a small range as hardly affects the bonding. In the last case, the adhesion amount after immersion reduces specifically by 10% or less, preferably by 5% or less relative to the adhesion amount before immersion.

When the membrane for fuel cell is washed by a solvent as above, the adhesion amount of the opposite polarity polymer at the surface of the solid polymer electrolyte membrane is ordinarily reduced because the polymer fraction having no ionic bonding (no ion pair) is removed. The upper limit of the adhesion amount of the opposite polarity polymer at the surface of the solid polymer electrolyte membrane after the washing is generally 0.01 mg/cm$^2$, preferably 0.005 mg/cm$^2$.

The membrane-electrode assembly for fuel cell, of the present invention can be obtained by bonding a catalyst electrode layer to both sides of the membrane for fuel cell. As the catalyst electrode layer, there can be used, with no restriction, one known for use in solid polymer electrolyte type fuel cell.

In general, the catalyst electrode layer comprises metal particles (which function as a catalyst) and an ion-conductive substance. For bonding the catalyst electrode layer to the membrane for fuel cell, there is a method of bonding an electrode which is made of a porous material having a catalyst electrode layer loaded thereon to the membrane for fuel cell, of the present invention. There is also a method of bonding only a catalyst electrode layer to the membrane for fuel cell and then bonding thereon an electrode made of a porous material.

As the ion-conductive substance constituting the catalyst electrode layer, there is used a substance having an ion exchange group of the same polarity as the ion exchange group possessed by the solid polymer electrolyte membrane. As to the ion-conductive substance, there is no particular restriction as long as it has an ion exchange group of the same polarity as the electrolyte membrane, and there can be used a known substance having such a function. As specific examples of the cation-conductive substance, there can be mentioned perfluorocarbonsulfonic acids such as Nafion (trade name) produced by DuPont and the like; sulfonation products or alkylsulfonation products of engineering plastics such as polyetheretherketone, polysulfone, polyethersulfone, polybenzimidazole, polyvinylimidazole, polyoxazole, polyphenylene oxide, polyphenylene sulfide and the like; sulfonation products of elastomers such as polystyrene-poly (ethylene-butylene)-polystyrene triblock copolymer, polystyrene-poly(ethylene-propylene)-polystyrene triblock copolymer and the like; polystyrenesulfonic acid; and derivatives thereof.

As the anion-conductive substance, there can be mentioned poly(4-vinylpyrdine), poly(2-vinylpyridine), polyethyleneimine, polyallylamine, polyaniline, polydiethylaminoethylstyrene, polyvinylimidazole, polybenzimidazole, polydimethylaminoethyl methacrylate, alkylation product of chloromethylated polystyrene, derivatives thereof, and products obtained by completely or partially quaternarizing the nitrogen atom of the above products.

As to the catalyst used in the catalyst electrode layer, there is no particular restriction as long as it is a metal which promotes the oxidation reaction of fuel (e.g. hydrogen or methanol) and the reduction reaction of oxygen. There can be mentioned, for example, platinum, gold, silver, palladium, iridium, rhodium, ruthenium, tin, iron, cobalt, nickel, molybdenum, tungsten, vanadium and alloys thereof. Of these catalysts, preferred are platinum, ruthenium, and a platinumruthenium alloy, which are superior in catalytic activity.

In view of the use in fuel cell, particularly preferred is a catalyst comprising a carrier (which is a carbon black such as furnace black, acetylene black or the like, or a conductive carbon such as active carbon, graphite or the like) and a metal (which functions as a reaction catalyst) loaded thereon. The conductive carbon which loads a catalyst metal thereon, may be any known conductive carbon. As the conductive carbon loading a catalyst metal thereon, used in the electrode for fuel cell, there are those described in, for example, JP-A-2002-329500, JP-A-2002-100373 and JP-A-1995-246336. Also, various catalysts different in carriers and catalyst metals loaded thereon are commercially available, and they can be used per se or after a required treatment has been applied.

The particle diameters of the catalyst metal are ordinarily 0.1 to 100 nm, preferably 0.5 to 10 nm. A metal of smaller particle diameters is higher in catalytic activity; however, metal particles of less than 0.5 nm are difficult to produce and metal particles of more than 100 nm are unable to exhibit a sufficient catalytic activity.

The content of the catalyst metal in the electrode catalyst layer is ordinarily 0.01 to 10 mg/cm$^2$, preferably 0.1 to 5.0 mg/cm$^2$ based on the sheet state of electrode catalyst layer. When the catalyst content is less than 0.01 mg/cm$^2$, no sufficient catalytic activity is exhibited; when the catalyst content is more than 10 mg/cm$^2$, the catalytic activity is saturated.

By forming a catalyst electrode layer constituted by the above-mentioned components, on the surface of the membrane for fuel cell, of the present invention, there can be obtained a membrane-catalyst electrode assembly for fuel cell.

The catalyst electrode layer is formed on the surface of the membrane for fuel cell so as to cover the opposite polarity polymer thin layer adhered to the surface of the solid polymer electrolyte membrane. The thickness of the catalyst electrode layer is preferably 5 to 50 µm.

The formation of the catalyst electrode layer is generally conducted by a method of coating, on the surface of the membrane for fuel cell, an catalyst electrode paste (which is a mixture of the above-mentioned individual components and a solvent) by screen printing or spraying and then drying the resulting material. Generally, to the catalyst electrode paste is added an organic solvent for viscosity adjustment, in order to control the amount of catalyst applied and the thickness of catalyst electrode layer formed.

The following method is also preferred for directly forming a catalyst electrode layer on the membrane for fuel cell, of the present invention. In this method, a catalyst electrode layer is beforehand formed on a film of polytetrafluoroethylene or polyester in the same manner as mentioned above. Then, the catalyst electrode layer is transferred onto the membrane for fuel cell. The catalyst electrode layer is transferred onto the membrane for fuel cell, generally by thermocompression bonding using an apparatus capable of applying a pressure and a heat, such as hot press, roll press or the like. The pressing temperature is generally 80° C. to 200° C., and the pressing pressure depends upon the thickness and hardness of catalyst electrode layer, but is ordinarily 0.5 to 20 MPa.

The membrane-catalyst electrode assembly for fuel cell, of the present invention may also be produced by forming a catalyst electrode layer supported by a porous electrode substrate and then bonding the catalyst electrode layer to the membrane for fuel cell, of the present invention. As the porous electrode substrate, there can be specifically mentioned, for example, a carbon fiber-woven cloth and a carbon paper. The thickness thereof is preferably 50 to 300 μm and the porosity is preferably 50 to 90%. The above-mentioned catalyst electrode paste is coated on such a porous electrode substrate and dried, to form a catalyst electrode layer loaded on a porous electrode substrate; then, the catalyst electrode layer is thermocompression-bonded to the membrane for fuel cell in the same manner as mentioned above; thereby, a membrane-catalyst electrode assembly for fuel cell, of the present invention can be produced.

The membrane-catalyst electrode assembly for fuel cell, produced as above is used in a solid electrolyte type fuel cell having a fundamental structure shown in FIG. 1.

EXAMPLES

The present invention is described more specifically below by way of Examples and Comparative Examples. However, the present invention is in no way restricted to these Examples. Incidentally, the properties of membranes for fuel cell and membrane-electrode assembly for fuel cell shown in the Examples and the Comparative Examples are the measurement values obtained by the following methods.

1) Ion Exchange Capacity

A membrane for fuel cell was immersed in a 1 mol/l aqueous HCl solution for at least 10 hours.

Then, when the membrane for fuel cell was a cation exchange type, the counter ion of the ion exchange group was changed from hydrogen ion to sodium ion using a 1 mol/l aqueous NaCl solution. The amount of hydrogen ion liberated was quantitatively determined using an aqueous sodium hydroxide solution, using a potentiometric titration apparatus (COMTITE-900, a product of Hiranuma Sangyo K.K.) (A mol).

When the membrane for fuel cell was an anion exchange type, the counter ion of the ion exchange group was changed from chloride ion to nitric acid ion using a 1 mol/l aqueous $NaNO_3$ solution. The amount of chloride ion liberated was quantitatively determined using an aqueous silver nitrate solution, using a potentiometric titration apparatus (COMTITE-900, a product of Hiranuma Sangyo K.K.) (A mol).

Next, the same membrane was immersed in a 1 mol/l aqueous HCl solution for at least 4 hours. Then, the membrane was sufficiently washed with a deionized water. The deionized water remaining on the membrane was removed and then the wet weight (Wg) of the membrane was measured. Then, the membrane was dried at 60° C. for 5 hours under reduced pressure and measured for dry weight (Dg).

Based on these measurement data, the ion exchange capacity and water content of membrane for fuel cell were determined using the following formulas.

Ion exchange capacity=$A \times 1000/D$[mmol/g (dried weight)]

Water content=$100 \times (W-D)/D$(%)

2) Membrane Resistance

In each chamber of a 2-chamber cell having two chambers separated by a membrane for fuel cell was placed a platinum black electrode. Each chamber was filled with a 3 mol/l aqueous sulfuric acid solution. Resistance at 25° C. between the platinum black electrodes was measured using an AC bridge circuit (frequency: 1,000 cycles/sec). Resistance between the electrodes was measured in the same manner, with placing no membrane for fuel cell. From the difference between this resistance between electrodes and the resistance when the membrane was placed, a membrane resistance was calculated. The membrane used in this measurement had been beforehand equilibrated by immersing it in a 3 mol/l aqueous sulfuric acid solution.

3) Total Adhesion Amount of Opposite Polarity Polymer to Solid Polymer Electrolyte Membrane (Solvent Immersion Method)

There was prepared 40 ml of an equal-mass mixed solution of methanol and a 0.5 mol/l aqueous sodium hydroxide solution. In this solution was immersed a membrane (8 cm×8 cm) for fuel cell, having an opposite polarity polymer adhered thereto, at room temperature for 16 hours, to dissolve the opposite polarity polymer in the mixed solution. Then, the resulting solution was analyzed by liquid chromatography. The amount of the opposite polarity polymer dissolved was determined using a calibration curve produced using a poly (4-vinylpyridine) (weight-average molecular weight: 160,000) or a polyethyleneimine (weight-average molecular weight: 70,000). The result of determination was divided by the total area (128 $cm^2$) of the both surfaces (sides) of the membrane for fuel cell to calculate the adhesion amount per unit area ($cm^2$) of one surface (one side) of the membrane for fuel cell; and this adhesion amount was taken as the total adhesion amount of opposite polarity polymer.

4) Adhesion Amount of Opposite Polarity Polymer to the Surface of Solid Polymer Electrolyte Membrane ATR method (used when the adhesion amount is 0.001 $mg/cm^2$ or more)

On each side of a germanium optical crystal (20 mm×50 mm×3 mm) was placed a membrane (10 mm×45 mm) for fuel cell, having an opposite polarity polymer adhered thereto, to prepare a sample. Attenuated total reflection absorption spectroscopy was conducted under the conditions of 25° C. and 50% R.H., using an infrared spectrometer (Spectrum One, a product of Perkin Elmer), to measure the multiple reflection infrared spectrum of the sample at incidence angle of 45°.

Meanwhile, a given amount of a poly(4-vinylpyridine) (weight-average molecular weight: 160,000) or a polyethyleneimine (weight-average molecular weight: 70,000) was coated on a polyethylene terephthalate film, to prepare a standard sample. Using this standard sample, the same measurement as above was conducted to measure the absorption intensity based on the characteristic absorption of pyridine group (1,640 $cm^{-1}$) or imine group (1,641 $cm^{-1}$). Using these data, a calibration curve was prepared. Using this calibration curve, there was measured the adhesion amount per unit area ($cm^2$) of opposite polarity polymer at the surface of membrane for fuel cell.

Application method of solvent immersion method (used when the adhesion amount is less than 0.001 $g/cm^2$)

First, the solvent immersion method explained in the above 3) was carried out to determine the total adhesion amount of opposite polarity polymer.

Then, onto a membrane for fuel cell, which cut out separately was sprayed an alumina oxide powder (containing no coarse particles and having an average particle diameter of about 30 μm) from a height of 100 mm from the electrolyte membrane surface, at a pressure of 0.2 MPa for 30 seconds, to scrape off the surface layer of the membrane by a thickness of 1 μm. Then, using the membrane from which the surface layer had been scraped off, the solvent immersion method was conducted again and an adhesion amount was determined, whereby was determined the substantial amount of the opposite polarity polymer which had permeated into the electrolyte membrane whose surface layer had been scraped off. By subtracting the total adhesion amount after scraping-off of surface layer, from the total adhesion amount before scraping-off of surface layer, the adhesion amount of opposite polarity polymer to the surface of electrolyte membrane was calculated.

Incidentally, when, using the solid electrolyte membranes produced in Examples 24 and 27 (described later), there was compared the adhesion amount to the surface of electrolyte membrane determined by the application method of solvent immersion method, with the adhesion amount to the surface of electrolyte membrane determined by the ATR method, the adhesion amounts determined by the former method were 0.0015 mg/cm$^2$ in Example 24 and 0.0021 mg/cm$^2$ in Example 27. Meanwhile, the adhesion amounts in these Examples, determined by the ATR method were completely the same as the above adhesion amounts as indicated in Table 7 described later. From this result, it was confirmed that the adhesion amounts of opposite polarity polymer to electrolyte membrane surface, determined by these two methods are substantially the same.

5) Adhesion Amounts of Opposite Polarity Polymer to the Surface Of Solid Polymer Electrolyte Membrane, Before and after Immersion in 50 Mass % Aqueous Methanol Solution A membrane (8 cm×8 cm) for fuel cell was immersed in 50 ml of a 50 mass % aqueous methanol solution of 30° C., at room temperature for 30 minutes. The membrane was taken out of the aqueous methanol solution. This immersion operation was repeated three times. Then, the membrane was dried at room temperature for 5 hours. Thereafter, the ATR method or the application method of solvent immersion method, both described in the above 3) was conducted to measure the adhesion amount of opposite polarity polymer and determine the adhesion amount of opposite polarity polymer to the surface of electrolyte membrane, after the immersion in aqueous methanol solution.

6) Bonding Property

A membrane-catalyst electrode assembly right after production was subjected to a tape peeling test in accordance with the X-cut tape peeling test of JIS K 5400. After peeling of tape, the condition of the electrode layer remaining on ion exchange membrane was observed visually and rated according to the 10-point method. This was taken as bonding property right after production.

Also, durability was rated in the test for output voltage of fuel cell using a hydrogen combustion type or direct methanol fuel cell (described later); then, the membrane-catalyst electrode assembly for fuel cell was taken out of the cell and its bonding property was rated. The rating was conducted by the tape peeling test as in the above test for rating of bonding property right after production.

7) Output Voltage of Hydrogen Type Fuel Cell

A membrane-catalyst electrode assembly for fuel call was interposed between two same carbon papers having a thickness of 200 μm and a porosity of 80%, to produce a fuel cell having a structure shown in FIG. 1. Then, the temperature of the fuel cell was set at 30° C. Hydrogen and air both of 30° C. and atmospheric pressure and both humidified were fed to a fuel chamber and an oxidizing agent chamber respectively at flow rates of 200 ml/min and 500 ml/min, to conduct a power generation test. Terminal voltages of cell at current densities of 0 A/cm$^2$ and 0.2 A/cm$^2$ were measured.

8) Output Voltage of Direct Methanol Fuel Cell

A membrane-catalyst electrode assembly for fuel call was interposed between two same carbon papers having a thickness of 200 μm and a porosity of 80%, to produce a fuel cell having a structure shown in FIG. 1. Then, the temperature of the fuel cell was set at 25° C. To the fuel electrode side was fed a 20 weight % aqueous methanol solution at a flow rate of 1 ml/min. To the oxidizing agent electrode side was fed oxygen of atmospheric pressure at a flow rate of 200 ml/min. Under such conditions, a power generation test was conducted, and terminal voltages of cell at current densities of 0 A/cm$^2$ and 0.1 A/cm$^2$ were measured.

9) Rating of Durability

After the above measurement of output voltage of fuel cell, a continuous power generation test was conducted at 25° C. and 0.2 A/cm$^2$ in the case of hydrogen type fuel cell and at 25° C. and 0.1 A/cm$^2$ in the case of direct methanol fuel cell. The output voltage after 250 hours was measured. With this measurement value, the durability of membrane-catalyst electrode assembly for fuel cell was rated.

Production Example 1

There was prepared a monomer composition consisting of 100 parts by mass of styrene, 10 parts by mass (8.0 mole % in total polymerizing monomers) of divinylbenzene and 5 parts by mass of tert-butyl peroxyethylhexanoate. Therein was immersed, at atmospheric pressure at 25° C. for 10 minutes, a porous membrane (thickness: 25 μm, porosity: 37%, average pore diameter: 0.03 μm) made of a polyethylene (PE, weight-average molecular weight: 250,000), to impregnate the porous membrane with the monomer composition.

The porous membrane was taken out of the monomer composition and covered at the both sides with a 100-μm polyester film (a peeling material). Then, thermal polymerization was conducted under nitrogen pressure of 0.3 MPa at 80° C. for 5 hours.

The resulting filmy material was immersed, at 40° C. for 45 minutes, in a 1:1 mixture of 98% concentrated sulfuric acid and chlorosulfonic acid (purity: 90% or more), to obtain a sulfonic acid type cation exchange membrane. The cation exchange membrane was measured for ion exchange capacity, water content, membrane resistance and membrane thickness. The results are shown in Table 2.

Production Examples 2 to 4

Cation exchange membranes were obtained in the same manner as in Production Example 1 except that the monomer composition and porous membrane of Production Example 1 were changed to those shown in Table 1. The cation exchange membranes were measured for ion exchange capacity, water content, membrane resistance and membrane thickness. The results are shown in Table 2.

Production Example 5

The cation exchange membrane of Production Example 1 was dried at room temperature for 24 hours. Then, the dried cation exchange membrane was immersed, at room temperature for 30 minutes, in a monomer composition consisting of 100 parts by mass of 4-vinylpyridine, 80 parts by mass (39.0 mole % in total polymerizing monomers) of divinylbenzene, 5 parts by mass of tert-butyl peroxyethylhexanoate, 900 parts by mass of toluene and 200 parts by mass of pyridine.

The ion exchange membrane was taken out of the monomer composition and covered at the both sides with a 100-μm polyester film (a peeling material). Then, thermal polymerization was conducted under nitrogen pressure of 0.3 MPa at 80° C. for 5 hours. The resulting polymerization product was immersed in methanol for 2 hours to obtain a cation exchange membrane having also an anion exchange group.

The above cation exchange membrane was measured for cation exchange capacity, water content, membrane resistance and membrane thickness. The results are shown in Table 2. The cation exchange membrane was subjected to elemental analysis. From the content of S was determined the amount of cation exchange group, and from the content of N was determined the amount of anion exchange group. The amount of cation exchange group was 2.4 mmol/g and the amount of anion exchange group was 1.2 mmol/g.

Production Example 6

There was prepared a monomer composition consisting of 90 parts by mass of chloromethylstyrene, 10 parts by mass (8.0 mole % in total polymerizing monomers) of divinylbenzene, 5 parts by mass of polyethylene glycol diepoxide (molecular weight: 400) and 5 parts by mass of tert-butyl peroxyethylhexanoate. In the monomer composition was immersed, at atmospheric pressure at 25° C. for 10 minutes, a porous membrane (thickness: 25 μm, porosity: 37%, average pore diameter: 0.03 μm) made of a polyethylene (PE, weight-average molecular weight: 250,000), to impregnate the porous membrane with the monomer composition.

Then, the porous membrane was taken out of the monomer composition and covered at the both sides with a 100-μm polyester film (a peeling material). Then, thermal polymerization was conducted under nitrogen pressure of 0.3 MPa at 80° C. for 5 hours.

The resulting filmy material was placed in an amination bath consisting of 10 parts by mass of 30 mass % triethylamine, 5 parts by mass of water and 5 parts by mass of acetone, and a reaction was allowed to take place at room temperature for 5 hours to obtain a quaternary ammonium salt type anion exchange membrane.

The anion exchange membrane was measured for ion exchange capacity, water content, membrane resistance and membrane thickness. The results are shown in Table 2.

TABLE 1

| Production Example | Porous membrane | Composition (mass parts) | | | | | DVB proportion (mole % in total polymerizing monomers) |
| --- | --- | --- | --- | --- | --- | --- | --- |
| | | St | CMS | DVB | PEGEP | PO | |
| 1 | A | 100 | 0 | 10 | 0 | 5 | 7.4 |
| 2 | A | 100 | 0 | 20 | 0 | 5 | 13.8 |
| 3 | A | 100 | 0 | 1 | 0 | 5 | 0.8 |
| 4 | B | 100 | 0 | 10 | 0 | 5 | 7.4 |
| 6 | A | 0 | 100 | 5 | 5 | 5 | 5.5 |

Porous membrane
A: Made of a polyethylene (weight-average molecular weight: 250,000), membrane thickness: 25 μm, average pore diameter: 0.03 μm, porosity: 37%
B: Made of a polyethylene (weight-average molecular weight: 200,000), membrane thickness: 16 μm, average pore diameter: 0.03 μm, porosity: 41%
St: Styrene
CMS: Chloromethylstyrene
DVB: Divinylbenzene
PEGEP: Polyethylene glycol diepoxide (molecular weight: 400)
PO: Tert-butyl peroxyethylhexanoate

TABLE 2

| Production Example | Ion exchange capacity (mmol/g of dried membrane) | Water content (%) | Membrane resistance (Ω·cm²) | Membrane thickness (μm) |
| --- | --- | --- | --- | --- |
| 1 | 2.4 | 29 | 0.08 | 31 |
| 2 | 2.1 | 20 | 0.17 | 29 |
| 3 | 2.5 | 45 | 0.04 | 32 |
| 4 | 2.4 | 30 | 0.06 | 20 |
| 5 | 1.2 | 22 | 0.15 | 29 |
| 6 | 1.8 | 22 | 0.08 | 31 |
| Nafion 117 | 1.0 | 23 | 0.26 | 180 |

Example 1

The cation exchange membrane of Production Example 1 was immersed in a 0.3 mass % aqueous polyethyleneimine (weight-average molecular weight: 10,000) solution at room temperature for 15 minutes. Then, the cation exchange membrane was taken out and dried at 25° C. for 16 hours at atmospheric pressure and further at 40° C. for 5 hours under reduced pressure, to obtain a membrane for fuel cell, of the present invention. The membrane for fuel cell was measured for cation exchange capacity, water content, membrane resistance, membrane thickness and adhesion amount of opposite polarity polymer. The results are shown in Table 4.

Separately, there was coated, on a polytetrafluoroethylene sheet, a mixture of a carbon black loading thereon 50 mass % of platinum and an alcohol and water solution containing 5% of perfluorocarbonsulfonic acid (the solution is a product of DuPont having a trade name of Nafion), so that the amount of catalyst coated became 0.5 mg/cm². Drying was conducted at 80° C. for 4 hours under reduced pressure to produce a catalyst electrode layer.

Then, the catalyst electrode layer was placed on both sides of the membrane for fuel cell, and they were subjected to hot-pressing at 100° C. at a pressure of 5 MPa for 100 seconds to obtain a membrane-catalyst electrode assembly for fuel cell. The membrane-catalyst electrode assembly for fuel cell was measured for bonding property, output voltage in hydrogen type fuel cell, and durability in hydrogen type fuel cell. The results are shown in Table 4.

Example 2

A membrane for fuel cell was obtained in the same manner as Example 1 except that the weight-average molecular weight of polyethyleneimine was changed to 70,000. The membrane for fuel cell was measured for cation exchange capacity, water content, membrane resistance, membrane thickness and adhesion amount of opposite polarity polymer. The results are shown in Table 4.

Then, a membrane-catalyst electrode assembly for fuel cell was obtained in the same manner as in Example 1. The membrane-catalyst electrode assembly for fuel cell was measured for bonding property, output voltage in hydrogen type fuel cell, and durability in hydrogen type fuel cell. The results are shown in Table 4.

Comparative Example 1

Using the cation exchange membrane of Production Example 1 per se as a membrane for fuel cell, a membrane-catalyst electrode assembly for fuel cell was produced in the same manner as in Example 1. The assembly was measured for bonding property, output voltage in hydrogen type fuel cell, and durability in hydrogen type fuel cell. The results are shown in Table 4.

Comparative Example 2

A membrane for fuel cell was obtained in the same manner as Example 1 except that the weight-average molecular weight of polyethyleneimine was changed to 600. The membrane for fuel cell was measured for cation exchange capacity, water content, membrane resistance, membrane thickness and adhesion amount of opposite polarity polymer. The results are shown in Table 4.

Then, a membrane-catalyst electrode assembly for fuel cell was obtained in the same manner as in Example 1. The membrane-catalyst electrode assembly for fuel cell was measured for bonding property, output voltage in hydrogen type fuel cell, and durability in hydrogen type fuel cell. The results are shown in Table 4.

Comparative Example 3

A membrane for fuel cell, having a polyethyleneimine adhered thereto was obtained in the same manner as in Example 1 except that there was used a non-crosslinked cation exchange membrane, i.e. a perfluorocarbonsulfonic acid membrane (Nafion 117, a product of DuPont, the membrane properties are shown in Table 2). The membrane for fuel cell was measured for cation exchange capacity, water content, membrane resistance, membrane thickness and adhesion amount of opposite polarity polymer. The results are shown in Table 4.

Then, a membrane-catalyst electrode assembly for fuel cell was obtained in the same manner as in Example 1. The membrane-catalyst electrode assembly for fuel cell was measured for bonding property, output voltage in hydrogen type fuel cell, and durability in hydrogen type fuel cell. The results are shown in Table 4.

Example 3

The cation exchange membrane of Production Example 1 was immersed in a methanol solution containing 0.2 mass % of a poly(2-vinylpyridine) (weight-average molecular weight: 16,000) at room temperature for 15 minutes. Then, the cation exchange membrane was taken out and dried at 25° C. for 10 hours at atmospheric pressure to obtain a membrane for fuel cell, of the present invention. The membrane for fuel cell was measured for cation exchange capacity, water content, membrane resistance, membrane thickness and adhesion amount of opposite polarity polymer. The results are shown in Table 4.

Then, there was coated, on the membrane for fuel cell, a mixture of a carbon black loading thereon 50 mass % of platinum and an alcohol and water solution containing 5% of a perfluorocarbonsulfonic acid (the solution is a product of DuPont having a trade name of Nafion), so that the amount of catalyst coated became 0.5 mg/cm$^2$. Drying was conducted at room temperature for 24 hours to produce a membrane-catalyst electrode assembly for fuel cell. The membrane-catalyst electrode assembly for fuel cell was measured for bonding property, output voltage in hydrogen type fuel cell, and durability in hydrogen type fuel cell. The results are shown in Table 4.

Examples 4 to 11

Membranes for fuel cell were obtained in the same manner as in Example 3 except that the cation exchange membrane, the kind of opposite polarity polymer adhered, and the concentration of methanol solution of opposite polarity polymer, of Example 3 were changed to those shown in Table 3. The membranes for fuel cell were measured for cation exchange capacity, water content, membrane resistance, membrane thickness and adhesion amount of opposite polarity polymer. The results are shown in Table 4.

Then, using these membranes for fuel cell, membrane-catalyst electrode assemblys for fuel cell were produced in the same manner as in Example 3. The membrane-catalyst electrode assemblys for fuel cell were measured for bonding property, output voltage in hydrogen type fuel cell, and durability in hydrogen type fuel cell. The results are shown in Table 4.

Comparative Example 4

The cation exchange membrane of Production Example 1 was immersed in a methanol solution containing 0.2 mass % of a poly(2-vinylpyridine) (weight-average molecular weight: 4,000) at room temperature for 15 minutes. Then, the cation exchange membrane was taken out and dried at 25° C. for 10 hours at atmospheric pressure to obtain a membrane for fuel cell. The membrane for fuel cell was measured for cation exchange capacity, water content, membrane resistance, membrane thickness and adhesion amount of opposite polarity polymer. The results are shown in Table 4.

Then, using the membrane for fuel cell, a membrane-catalyst electrode assembly for fuel cell was produced in the same manner as in Example 3. The membrane-catalyst electrode assembly for fuel cell was measured for bonding property, output voltage in hydrogen type fuel cell, and durability in hydrogen type fuel cell. The results are shown in Table 4.

Comparative Example 5

The cation exchange membrane of Production Example 1 was immersed in a methanol solution containing 0.001 mass % of a poly(4-vinylpyridine) (weight-average molecular weight: 160,000) at room temperature for 2 minutes. Then, the cation exchange membrane was taken out and dried at 25° C. for 10 hours at atmospheric pressure to obtain a membrane for fuel cell. The membrane for fuel cell was measured for cation exchange capacity, water content, membrane resistance, membrane thickness and adhesion amount of opposite polarity polymer. The results are shown in Table 4.

Then, using the membrane for fuel cell, a membrane-catalyst electrode assembly for fuel cell was produced in the same manner as in Example 3. The assembly was measured for bonding property, output voltage in hydrogen type fuel cell, and durability in hydrogen type fuel cell. The results are shown in Table 4.

Comparative Example 6

The cation exchange membrane of Production Example 1 was immersed in a methanol solution containing 10.0 mass % of a poly(4-vinylpyridine) (weight-average molecular weight: 160,000) at room temperature for 15 minutes. Then, the cation exchange membrane was taken out and dried at 25° C. for 10 hours at atmospheric pressure to obtain a membrane for fuel cell. The membrane for fuel cell was measured for cation exchange capacity, water content, membrane resistance, membrane thickness and adhesion amount of opposite polarity polymer. The results are shown in Table 4.

Then, using the membrane for fuel cell, a membrane-catalyst electrode assembly for fuel cell was produced in the same manner as in Example 3. The membrane-catalyst electrode assembly for fuel cell was measured for bonding property, output voltage in hydrogen type fuel cell, and durability in hydrogen type fuel cell. The results are shown in Table 4.

Comparative Example 7

A membrane for fuel cell, having a poly(4-vinylpyridine) adhered thereto was obtained in the same manner as in Example 4 except that there was used a perfluorocarbonsulfonic acid membrane (Nafion 117, a product of DuPont, the membrane properties are shown in Table 2). The membrane for fuel cell was measured for cation exchange capacity, water content, membrane resistance, membrane thickness and adhesion amount of opposite polarity polymer. The results are shown in Table 4.

Then, a membrane-catalyst electrode assembly for fuel cell was produced in the same manner as in Example 1. The assembly was measured for bonding property, output voltage in hydrogen type fuel cell, and durability in hydrogen type fuel cell. The results are shown in Table 4.

Example 12

The cation exchange membrane of Production Example 5 was immersed in a methanol solution containing 0.06 mass % of a poly(4-vinylpyridine) (weight-average molecular weight: 160,000) at room temperature for 15 minutes. Then, the cation exchange membrane was taken out and dried at 25° C. for 10 hours at atmospheric pressure to obtain a membrane for fuel cell. The membrane for fuel cell was measured for cation exchange capacity, water content, membrane resistance, membrane thickness and adhesion amount of opposite polarity polymer. The results are shown in Table 5.

Separately, there was coated, on a polytetrafluoroethylene sheet, a mixture of a carbon black loading thereon 50 mass % of a platinum-ruthenium alloy catalyst (ruthenium: 50 mole %) and an alcohol and water solution containing 5% of perfluorocarbonsulfonic acid (the solution is a product of DuPont having a trade name of Nafion), so that the amount of catalyst coated became 3 mg/cm$^2$. Drying was conducted at 80° C. for 4 hours under reduced pressure to produce a catalyst electrode layer.

Then, the catalyst electrode layer was placed on both sides of the membrane for fuel cell, and they were subjected to hot-pressing at 100° C. at a pressure of 5 MPa for 100 seconds to obtain a membrane-catalyst electrode assembly for fuel cell. The membrane-catalyst electrode assembly for fuel cell was measured for bonding property, output voltage in direct methanol fuel cell, and durability in direct methanol fuel cell. The results are shown in Table 5.

Example 13

A membrane for fuel cell was obtained in the same manner as in Example 12 except that the concentration of the poly(4-vinylpyridine) (weight-average molecular weight: 160,000) was changed to 0.1 mass %. The membrane for fuel cell was measured for cation exchange capacity, water content, membrane resistance, membrane thickness and adhesion amount of opposite polarity polymer. The results are shown in Table 5.

Then, a membrane-catalyst electrode assembly for fuel cell was produced in the same manner as in Example 12. The assembly was measured for bonding property, output voltage in direct methanol fuel cell, and durability in direct methanol fuel cell. The results are shown in Table 5.

Example 14

A membrane for fuel cell was obtained in the same manner as in Example 12 except that the concentration of the poly(4-vinylpyridine) (weight-average molecular weight: 160,000) was changed to 0.2 mass %. The membrane for fuel cell was measured for cation exchange capacity, water content, membrane resistance, membrane thickness and adhesion amount of opposite polarity polymer. The results are shown in Table 5.

Then, a membrane-catalyst electrode assembly for fuel cell was produced in the same manner as in Example 12.

The assembly was measured for bonding property, output voltage in direct methanol fuel cell, and durability in direct methanol fuel cell. The results are shown in Table 5.

Comparative Example 8

Using the cation exchange membrane of Production Example 5 per se as a membrane for fuel cell, a membrane-catalyst electrode assembly for fuel cell was produced in the same manner as in Example 12. The assembly was measured for bonding property, output voltage in direct methanol fuel cell, and durability in direct methanol fuel cell. The results are shown in Table 5.

Example 15

The anion exchange membrane of Production Example 6 was immersed in a 0.2 mass % aqueous polystyrenesulfonic acid (molecular weight: 75,000) solution at room temperature for 15 minutes. Then, the anion exchange membrane was taken out and dried at 25° C. for 24 hours at atmospheric pressure to obtain a membrane for fuel cell, of the present invention. The membrane for fuel cell was measured for anion exchange capacity, water content, membrane resistance, membrane thickness and adhesion amount of opposite polarity polymer. The results are shown in Table 4.

Then, on the membrane for fuel cell was coated a mixture of the platinum-loaded carbon black used in Example 1 and an N,N-dimethylformamide solution containing 5% of an N-methylated poly(4-vinylpyridine) (molecular weight: 60,000, methylation ratio: 20 mole %), so that the coated amount of the catalyst became 0.5 mg/cm$^2$, followed by drying at 25° C. for 5 hours and at 80° C. for 4 hours under reduced pressure. Successively, the above-obtained filmy material was subjected to thermocompression bonding at 100° C. for 100 seconds at a pressure of 5 MPa. The resulting material was allowed to stand at room temperature for 2 minutes to obtain a membrane-catalyst electrode assembly for fuel cell. The membrane-catalyst electrode assembly for fuel cell was measured for bonding property, output voltage in hydrogen type fuel cell, and durability in hydrogen type fuel cell. The results are shown in Table 4.

Comparative Example 9

Using the anion exchange membrane of Production Example 6 per se as a membrane for fuel cell, there was produced a membrane-catalyst electrode assembly for fuel cell in the same manner as in Example 15. The assembly was measured for bonding property, output voltage in hydrogen type fuel cell, and durability in hydrogen type fuel cell. The results are shown in Table 4.

TABLE 3

|  | Solid polymer electrolyte membrane | Kind of opposite polarity polymer | Weight-average molecular weight of opposite polarity polymer | Concentration of opposite polarity polymer solution (wt. %) |
| --- | --- | --- | --- | --- |
| Example 1 | Production Example 1 | PEI | 10,000 | 0.3 |
| Example 2 | Production Example 1 | PEI | 70,000 | 0.3 |
| Example 3 | Production Example 1 | P2VP | 16,000 | 0.2 |
| Example 4 | Production Example 1 | P4VP | 160,000 | 0.2 |
| Example 5 | Production Example 1 | P4VP | 160,000 | 0.03 |
| Example 6 | Production Example 1 | P4VP | 160,000 | 0.08 |
| Example 7 | Production Example 1 | P4VP | 160,000 | 2.0 |
| Example 8 | Production Example 1 | P4VP | 50,000 | 0.2 |
| Example 9 | Production Example 2 | P4VP | 160,000 | 0.2 |
| Example 10 | Production Example 3 | P4VP | 160,000 | 0.2 |
| Example 11 | Production Example 4 | P4VP | 160,000 | 0.2 |
| Example 12 | Production Example 5 | P4VP | 160,000 | 0.06 |
| Example 13 | Production Example 5 | P4VP | 160,000 | 0.1 |
| Example 14 | Production Example 5 | P4VP | 160,000 | 0.2 |
| Example 15 | Production Example 6 | PSSA | 75,000 | 0.2 |
| Comp. Example 1 | Production Example 1 | Not used | — | — |
| Comp. Example 2 | Production Example 1 | PEI | 600 | 0.3 |
| Comp. Example 3 | Nafion | PEI | 10,000 | 0.3 |
| Comp. Example 4 | Production Example 1 | P2VP | 4000 | 0.2 |
| Comp. Example 5 | Production Example 1 | P4VP | 160,000 | 0.001 |
| Comp. Example 6 | Production Example 1 | P4VP | 160,000 | 10.0 |
| Comp. Example 7 | Nafion | P4VP | 160,000 | 0.2 |
| Comp. Example 8 | Production Example 5 | Not used | — | — |
| Comp. Example 9 | Production Example 6 | Not used | — | — |

PEI: Polyethyleneimine
P2VP: Poly(2-vinylpyridine)
P4VP: Poly(4-vinylpyridine)
PSSA: Polystyrenesulfonic acid

TABLE 4

|  | Ion exchange capacity (mmol/g of dried membrane) | Water content (%) | Membrane resistance ($\Omega \cdot cm^2$) | Membrane thickness (μm) | Adhesion amount of opposite polarity polymer (mg/cm$^2$) | | Bonding property (point) | | Output voltage of hydrogen type fuel cell (V) | | Durability after power generation of 250 hours (V) |
| --- | --- | --- | --- | --- | --- | --- | --- | --- | --- | --- | --- |
|  |  |  |  |  | Membrane surface | Total amount | Right after production | After power generation of 250 hours | 0 A/cm$^2$ | 0.2 A/cm$^2$ | 0.2 A/cm$^2$ |
| Ex. 1 | 2.4 | 29 | 0.08 | 31 | 0.0021 | 0.0090 | 8 | 6 | 0.93 | 0.35 | 0.25 |
| Ex. 2 | 2.4 | 30 | 0.08 | 31 | 0.0080 | 0.0080 | 10 | 8 | 0.97 | 0.44 | 0.34 |
| Ex. 3 | 2.4 | 29 | 0.08 | 30 | 0.0052 | 0.0074 | 8 | 6 | 0.95 | 0.38 | 0.28 |
| Ex. 4 | 2.4 | 29 | 0.08 | 30 | 0.011 | 0.011 | 10 | 10 | 1.05 | 0.58 | 0.56 |
| Ex. 5 | 2.4 | 29 | 0.08 | 30 | 0.0021 | 0.0021 | 10 | 10 | 1.00 | 0.55 | 0.53 |
| Ex. 6 | 2.4 | 28 | 0.08 | 31 | 0.0083 | 0.0083 | 10 | 10 | 1.04 | 0.57 | 0.55 |
| Ex. 7 | 2.4 | 30 | 0.09 | 31 | 0.22 | 0.22 | 10 | 10 | 0.98 | 0.41 | 0.37 |
| Ex. 8 | 2.4 | 29 | 0.08 | 30 | 0.0091 | 0.0091 | 10 | 10 | 0.99 | 0.45 | 0.38 |
| Ex. 9 | 2.1 | 20 | 0.17 | 29 | 0.010 | 0.010 | 10 | 10 | 0.98 | 0.53 | 0.50 |
| Ex. 10 | 2.5 | 45 | 0.06 | 32 | 0.0015 | 0.053 | 6 | 4 | 0.93 | 0.31 | 0.22 |
| Ex. 11 | 2.4 | 31 | 0.06 | 20 | 0.011 | 0.011 | 10 | 10 | 1.04 | 0.59 | 0.57 |
| Ex. 15 | 1.8 | 22 | 0.08 | 30 | 0.015 | 0.015 | 10 | 8 | 0.98 | 0.26 | 0.23 |
| Comp. Ex. 1 | 2.3 | 29 | 0.08 | 31 | — | — | 0 | 0 | 0.90 | 0.25 | 0.12 |
| Comp. Ex. 2 | 2.3 | 26 | 0.10 | 31 | 0.0006 | 0.035 | 2 | 0 | 0.91 | 0.26 | 0.13 |
| Comp. Ex. 3 | 0.7 | 21 | 0.40 | 180 | 0.0007 | 0.16 | 0 | 0 | 0.95 | 0.23 | 0.11 |
| Comp. Ex. 4 | 2.3 | 30 | 0.10 | 31 | 0.0007 | 0.024 | 0 | 0 | 0.92 | 0.25 | 0.12 |
| Comp. Ex. 5 | 2.4 | 30 | 0.08 | 30 | 0.00005* | 0.00005 | 0 | 0 | 0.90 | 0.25 | 0.11 |
| Comp. Ex. 6 | 2.0 | 32 | 0.18 | 35 | 0.64 | 0.64 | 4 | 2 | 0.88 | 0.08 | 0.01 |
| Comp. Ex. 7 | 0.8 | 21 | 0.37 | 180 | 0.0006 | 0.014 | 2 | 0 | 0.95 | 0.24 | 0.12 |
| Comp. Ex. 9 | 1.8 | 23 | 0.08 | 30 | — | — | 0 | 0 | 0.89 | 0.15 | 0.04 |

Measured by the application method of the solvent immersion method (all the adhesion amounts having no * mark were obtained by the ATR method).

TABLE 5

| | Ion exchange capacity (mmol/g of dried membrane) | Water content (%) | Membrane resistance (Ω·cm²) | Membrane thickness (μm) | Adhesion amount of opposite polarity polymer (mg/cm²) | | Bonding property (point) | | Output voltage of direct methanol fuel cell (V) | | Durability after power generation of 250 hours (V) |
|---|---|---|---|---|---|---|---|---|---|---|---|
| | | | | | Membrane surface | Total amount | Right after production | After power generation of 250 hours | 0 A/cm² | 0.2 A/cm² | 0.2 A/cm² |
| Ex. 12 | 1.2 | 22 | 0.15 | 29 | 0.006 | 0.006 | 10 | 10 | 0.84 | 0.33 | 0.26 |
| Ex. 13 | 1.2 | 22 | 0.15 | 29 | 0.009 | 0.009 | 10 | 10 | 0.81 | 0.28 | 0.20 |
| Ex. 14 | 1.2 | 22 | 0.15 | 29 | 0.010 | 0.010 | 10 | 10 | 0.80 | 0.28 | 0.20 |
| Comp. Ex. 8 | 1.2 | 22 | 0.15 | 29 | — | — | 0 | 0 | 0.63 | 0.15 | 0.04 |

Example 16

A membrane for fuel cell was produced in the same manner as in Example 2.

Separately, there was coated, on a polytetrafluoroethylene sheet, a mixture of a carbon black loading thereon 50 mass % of a platinum-ruthenium alloy catalyst (ruthenium: 50 mole %) and an alcohol and water solution containing 5% of perfluorocarbonsulfonic acid (the solution is a product of DuPont having a trade name of Nafion), so that the amount of catalyst coated became 3 mg/cm². Drying was conducted at 80° C. for 4 hours under reduced pressure to produce a catalyst electrode layer.

Then, the catalyst electrode layer was placed on both sides of the membrane for fuel cell, and they were subjected to hot-pressing at 100° C. at a pressure of 5 MPa for 100 seconds to obtain a membrane-catalyst electrode assembly for fuel cell. The membrane-catalyst electrode assembly for fuel cell was measured for bonding property, output voltage in direct methanol fuel cell, and durability in direct methanol fuel cell. The results are shown in Table 6.

Comparative Example 10

Using the cation exchange membrane of Production Example 1 per se as a membrane for fuel cell, a membrane-catalyst electrode assembly for fuel cell was produced in the same manner as in Example 16. The assembly was measured for bonding property, output voltage in direct methanol fuel cell, and durability in direct methanol fuel cell. The results are shown in Table 7.

Example 17

A membrane-catalyst electrode assembly for fuel cell was produced in the same manner as in Example 16 except that the membrane for fuel cell produced in Example 4 was used. The membrane-catalyst electrode assembly for fuel cell was measured for bonding property, output voltage in direct methanol fuel cell, and durability in direct methanol fuel cell. The results are shown in Table 7.

Example 18

A membrane-catalyst electrode assembly for fuel cell was produced in the same manner as in Example 16 except that the membrane for fuel cell produced in Example 14 was used. The membrane-catalyst electrode assembly for fuel cell was measured for bonding property, output voltage in direct methanol fuel cell, and durability in direct methanol fuel cell. The results are shown in Table 7.

Comparative Example 11

Using the cation exchange membrane of Production Example 5 per se as a membrane for fuel cell, a membrane-catalyst electrode assembly for fuel cell was produced in the same manner as in Example 16. The assembly was measured for bonding property, output voltage in direct methanol fuel cell, and durability in direct methanol fuel cell. The results are shown in Table 7.

Example 19

The membrane for fuel cell produced in the same manner as in Example 1 was immersed in a deionized water at room temperature for 30 minutes and further three times each time using a fresh deionized water. Then, drying was conducted at room temperature for 5 hours. The resulting membrane for fuel cell was measured for cation exchange capacity, water content, membrane resistance, membrane thickness and amount of opposite polarity polymer.

Then, using the membrane for fuel cell, a membrane-catalyst electrode assembly for fuel cell was produced in the same manner as in Example 16. The assembly was measured for bonding property, output voltage in direct methanol fuel cell, and durability in direct methanol fuel cell.

Example 20

The membrane for fuel cell produced in the same manner as in Example 2 was subjected to the same washing treatment as in Example 19, to obtain a membrane for fuel cell. The resulting membrane for fuel cell was measured for cation exchange capacity, water content, membrane resistance, membrane thickness and amount of opposite polarity polymer.

Then, using the membrane for fuel cell, a membrane-catalyst electrode assembly for fuel cell was produced in the same manner as in Example 16. The assembly was measured for bonding property, output voltage in direct methanol fuel cell, and durability in direct methanol fuel cell. The results are shown in Table 7.

Comparative Example 12

In the same manner as in Comparative Example 3, there was obtained a membrane for fuel cell which comprised a non-crosslinked cation exchange membrane, i.e. a perfluorocarbonsulfonic acid membrane (Nafion 117 produced by DuPont, the properties thereof are shown in Table 2) and a polyethyleneimine adhered to the membrane.

Then, the membrane for fuel cell was subjected to the same washing treatment as in Example 19, to obtain a membrane for fuel cell. The resulting membrane for fuel cell was measured for cation exchange capacity, water content, membrane resistance, membrane thickness and amount of opposite polarity polymer.

Then, using the membrane for fuel cell, a membrane-catalyst electrode assembly for fuel cell was produced in the same manner as in Example 16. The assembly was measured for bonding property, output voltage in direct methanol fuel cell, and durability in direct methanol fuel cell. The results are shown in Table 7.

Example 21

The membrane for fuel cell produced in the same manner as in Example 3 was immersed in 100% methanol at room temperature for 30 minutes and further three times each time using fresh 100% methanol. Drying was conducted at room temperature for 5 hours. The resulting membrane for fuel cell was measured for cation exchange capacity, water content, membrane resistance, membrane thickness and amount of opposite polarity polymer.

Then, using the membrane for fuel cell, a membrane-catalyst electrode assembly for fuel cell was produced in the same manner as in Example 16. The assembly was measured for bonding property, output voltage in direct methanol fuel cell, and durability in direct methanol fuel cell. The results are shown in Table 7.

Examples 22 to 30

Membranes for fuel cell were obtained in the same manner as in Example 21 except that membranes produced in the Examples shown in Table 6 were used in the immersion treatment in 100% methanol. The resulting membranes for fuel cell were measured for cation exchange capacity, water content, membrane resistance, membrane thickness and amount of opposite polarity polymer.

Then, using these membranes for fuel cell, membrane-catalyst electrode assemblys for fuel cell were produced in the same manner as in Example 16. The assemblys were measured for bonding property, output voltage in direct methanol fuel cell, and durability in direct methanol fuel cell. The results are shown in Table 7.

Comparative Example 13

The membrane for fuel cell produced in the same manner as in Comparative Example 5 was subjected to the same washing treatment as in Example 21, to obtain a membrane for fuel cell. The resulting membrane for fuel cell was measured for cation exchange capacity, water content, membrane resistance, membrane thickness and amount of opposite polarity polymer.

Then, using the membrane for fuel cell, a membrane-catalyst electrode assembly for fuel cell was produced in the same manner as in Example 16. The assembly was measured for bonding property, output voltage in direct methanol fuel cell, and durability in direct methanol fuel cell. The results are shown in Table 7.

Comparative Example 14

In the same manner as in Comparative Example 7, there was obtained a membrane for fuel cell, which comprised a non-crosslinked cation exchange membrane, i.e. a perfluorocarbonsulfonic acid membrane (Nafion 117 produced by DuPont, the properties thereof are shown in Table 2) and a poly(4-vinylpyridine) adhered to the membrane.

Then, the membrane for fuel cell was subjected to the same washing treatment as in Example 21, to obtain a membrane for fuel cell. The resulting membrane for fuel cell was measured for cation exchange capacity, water content, membrane resistance, membrane thickness and amount of opposite polarity polymer.

Then, using the membrane for fuel cell, a membrane-catalyst electrode assembly for fuel cell was produced in the same manner as in Example 16. The assembly was measured for bonding property, output voltage in direct methanol fuel cell, and durability in direct methanol fuel cell. The results are shown in Table 7.

Example 31

The membrane for fuel cell (comprising an anion exchange membrane) produced in the same manner as in Example 15 was immersed in a deionized water at room temperature for 30 minutes and further three times each time using a fresh deionized water. Then, drying was conducted at room temperature for 5 hours. The resulting membrane for fuel cell was measured for cation exchange capacity, water content, membrane resistance, membrane thickness and amount of opposite polarity polymer.

Then, there was coated, on the membrane for fuel cell, a mixture of the carbon black (used in Example 16) loading thereon 50 mass % of a platinum-ruthenium alloy catalyst (ruthenium: 50 mole %) and an N,N-dimethylformamide solution containing 5% of an N-methylated poly(4-vinylpyridine) (molecular weight: 60,000, methylation ration: 20 mole %), so that the coated amount of the catalyst became 3 mg/cm$^2$. The coated membrane was dried at 25° C. for 5 hours and at 80° C. for 4 hours under reduced pressure, to obtain a filmy material. The filmy material was subjected to thermocompression bonding at 100° C. for 100 seconds at a pressure of 5 MPa and then allowed to stand at room temperature for 2 minutes, to obtain a membrane-catalyst electrode assembly for fuel cell. The membrane-catalyst electrode assembly for fuel cell was measured for bonding property, output voltage in direct methanol fuel cell, and durability in direct methanol fuel cell. The results are shown in Table 7.

Comparative Example 15

Using the anion exchange membrane of Production Example 6 per se as a membrane for fuel cell, a membrane-catalyst electrode assembly for fuel cell was produced in the same manner as in Example 31. The assembly was measured for bonding property, output voltage in direct methanol fuel cell, and durability in direct methanol fuel cell. The results are shown in Table 7.

TABLE 6

| | Solid polymer electrolyte membrane | Kind of opposite polarity polymer | Weight-average molecular weight of opposite polarity polymer | Concentration of opposite polarity polymer solution (wt. %) | Washing |
|---|---|---|---|---|---|
| Example 16 | Example 2 | PEI | 70,000 | 0.3 | No |
| Example 17 | Example 4 | P4VP | 160,000 | 0.2 | No |
| Example 18 | Example 14 | P4VP | 160,000 | 0.2 | No |
| Example 19 | Example 1 | PEI | 10,000 | 0.3 | Yes |
| Example 20 | Example 2 | PEI | 70,000 | 0.3 | Yes |
| Example 21 | Example 3 | P2VP | 16,000 | 0.2 | Yes |
| Example 22 | Example 4 | P4VP | 160,000 | 0.2 | Yes |
| Example 23 | Example 5 | P4VP | 160,000 | 0.03 | Yes |
| Example 24 | Example 6 | P4VP | 160,000 | 0.08 | Yes |
| Example 25 | Example 7 | P4VP | 160,000 | 2.0 | Yes |
| Example 26 | Example 8 | P4VP | 50,000 | 0.2 | Yes |
| Example 27 | Example 9 | P4VP | 160,000 | 0.2 | Yes |
| Example 28 | Example 10 | P4VP | 160,000 | 0.2 | Yes |
| Example 29 | Example 11 | P4VP | 160,000 | 0.2 | Yes |
| Example 30 | Example 14 | P4VP | 160,000 | 0.2 | Yes |
| Example 31 | Example 15 | PSSA | 75,000 | 0.2 | Yes |
| Comp. Example 10 | Prod. Example 1 | Not used | — | — | — |
| Comp. Example 11 | Prod. Example 5 | Not used | — | — | — |
| Comp. Example 12 | Comp. Example 3 (Nafion) | PEI | 10,000 | 0.3 | Yes |
| Comp. Example 13 | Comp. Example 5 | P4VP | 160,000 | 0.001 | No |
| Comp. Example 14 | Comp. Example 7 (Nafion) | P4VP | 160,000 | 0.2 | Yes |
| Comp. Example 15 | Prod. Example 6 | Not used | — | — | — |

PEI: Polyethyleneimine
P2VP: Poly(2-vinylpyridine)
P4VP: Poly(4-vinylpyridine)
PSSA: Polystyrenesulfonic acid

TABLE 7

| | Ion exchange capacity (mmol/g of dried membrane) | Water content (%) | Membrane resistance ($\Omega \cdot cm^2$) | Membrane thickness (μm) | Adhesion amount of opposite polarity polymer (mg/cm$^2$) Surface Before methanol immersion | Adhesion amount of opposite polarity polymer (mg/cm$^2$) Surface After methanol immersion | Total amount | Bonding property (point) Right after production | Bonding property (point) After power generation of 250 hours | Output voltage of fuel cell (V) 0 A/cm$^2$ | Output voltage of fuel cell (V) 0.1 A/cm$^2$ | Durability after power generation of 250 hours (V) 0.1 A/cm$^2$ |
|---|---|---|---|---|---|---|---|---|---|---|---|---|
| Ex. 16 | 2.4 | 30 | 0.08 | 31 | 0.0080 | 0.0020 | 0.0080 | 10 | 6 | 0.57 | 0.25 | 0.16 |
| Ex. 17 | 2.4 | 29 | 0.08 | 30 | 0.011 | 0.0022 | 0.011 | 10 | 8 | 0.57 | 0.27 | 0.17 |
| Ex. 18 | 1.2 | 22 | 0.15 | 29 | 0.010 | 0.0020 | 0.010 | 10 | 10 | 0.81 | 0.28 | 0.20 |
| Ex. 19 | 2.4 | 29 | 0.08 | 31 | 0.0012 | 0.0010 | 0.0080 | 6 | 4 | 0.59 | 0.26 | 0.22 |
| Ex. 20 | 2.4 | 30 | 0.08 | 31 | 0.0019 | 0.0018 | 0.0019 | 8 | 6 | 0.60 | 0.28 | 0.25 |
| Ex. 21 | 2.4 | 29 | 0.08 | 30 | 0.0024 | 0.0023 | 0.0028 | 10 | 8 | 0.60 | 0.30 | 0.27 |
| Ex. 22 | 2.4 | 29 | 0.08 | 30 | 0.0020 | 0.0020 | 0.0020 | 10 | 10 | 0.61 | 0.34 | 0.32 |
| Ex. 23 | 2.4 | 29 | 0.08 | 30 | 0.0004* | 0.0004* | 0.0004 | 10 | 10 | 0.59 | 0.28 | 0.27 |
| Ex. 24 | 2.4 | 28 | 0.08 | 31 | 0.0015 | 0.0015 | 0.0015 | 10 | 10 | 0.60 | 0.33 | 0.31 |
| Ex. 25 | 2.4 | 30 | 0.08 | 31 | 0.0025 | 0.0024 | 0.0025 | 10 | 10 | 0.60 | 0.33 | 0.31 |
| Ex. 26 | 2.4 | 29 | 0.08 | 30 | 0.0022 | 0.0022 | 0.0022 | 10 | 10 | 0.61 | 0.34 | 0.31 |
| Ex. 27 | 2.1 | 20 | 0.17 | 29 | 0.0021 | 0.0020 | 0.0021 | 10 | 10 | 0.67 | 0.34 | 0.31 |
| Ex. 28 | 2.5 | 45 | 0.06 | 32 | 0.0012 | 0.0011 | 0.034 | 6 | 4 | 0.58 | 0.26 | 0.22 |
| Ex. 29 | 2.4 | 31 | 0.06 | 20 | 0.0020 | 0.0020 | 0.0020 | 10 | 10 | 0.60 | 0.36 | 0.34 |
| Ex. 30 | 1.2 | 22 | 0.15 | 29 | 0.0019 | 0.0018 | 0.0019 | 10 | 10 | 0.89 | 0.44 | 0.41 |
| Ex. 31 | 1.8 | 22 | 0.08 | 30 | 0.0028 | 0.0026 | 0.0028 | 10 | 8 | 0.64 | 0.16 | 0.13 |
| Comp. Ex. 10 | 2.4 | 29 | 0.08 | 31 | — | — | — | 0 | 0 | 0.60 | 0.23 | 0.10 |
| Comp. Ex. 11 | 1.2 | 22 | 0.15 | 29 | — | — | — | 0 | 0 | 0.63 | 0.15 | 0.04 |
| Comp. Ex. 12 | 0.7 | 21 | 0.37 | 180 | 0.0006 | 0.0006 | 0.14 | 0 | 0 | 0.30 | 0.03 | 0 |
| Comp. Ex. 13 | 2.4 | 29 | 0.08 | 30 | 0.00005* | 0.00002* | 0.00005 | 0 | 0 | 0.59 | 0.25 | 0.10 |
| Comp. Ex. 14 | 0.8 | 21 | 0.36 | 180 | 0.0005 | 0.0005 | 0.12 | 0 | 0 | 0.28 | 0.03 | 0 |
| Comp. Ex. 15 | 1.8 | 23 | 0.08 | 30 | — | — | — | 0 | 0 | 0.62 | 0.10 | 0.04 |

Measured by the application method of the solvent immersion method (all the adhesion amounts having no * mark were obtained by the ATR method).

The invention claimed is:

1. A membrane for a fuel cell, comprising:
a solid polymer electrolyte membrane composed of a crosslinked ion exchange resin, and
a polymer adhered onto at least one surface of the solid polymer electrolyte membrane in an amount of 0.0001 to 0.5 mg/cm$^2$, which polymer has a charge group of a polarity opposite to that of the ion exchange group of the ion exchange resin and has a weight-average molecular weight of 5,000 to 1,000,000.

2. The membrane for a fuel cell according to claim 1, wherein the polymer is adhered onto at least one surface of the solid polymer electrolyte membrane in a state that, when the membrane for fuel cell is immersed in a 50 mass % aqueous methanol solution of 30° C., there is substantially no difference in the adhesion amounts of the polymer before and after the immersion.

3. The membrane for a fuel cell according to claim 1, wherein the solid polymer electrolyte membrane is formed by polymerizing a monomer composition containing a bi- or higher functional, crosslinking monomer in an amount of 0.5 to 40 mol % of the total polymerizing monomers.

4. A membrane-electrode assembly for a fuel cell, comprising:
a membrane for fuel cell according to claim 1, and
a catalyst electrode layer bonded to the surface of the membrane for fuel cell, which catalyst electrode layer contains an ion exchange resin having the same polarity as the crosslinked ion exchange resin composing the solid polymer electrolyte membrane, and a catalyst substance.

5. A process for producing a membrane for a fuel cell, which comprises contacting at least one surface of a solid polymer electrolyte membrane composed of a crosslinked ion exchange resin, with a solution of a polymer of 5,000 to 1,000,000 in weight-average molecular weight, having a charge group having a polarity opposite to that of the ion exchange group of the ion exchange resin and then conducting drying to adhere, onto the surface of the solid polymer electrolyte membrane, said polymer in an amount of 0.0001 to 0.5 mg/cm$^2$.

6. A process for producing a membrane for a fuel cell, which comprises contacting at least one surface of a solid polymer electrolyte membrane composed of a crosslinked ion exchange resin, with a solution of a polymer of 5,000 to 1,000,000 in weight-average molecular weight, having a charge group having a polarity opposite to that of the ion exchange group of the ion exchange resin, to obtain a solid polymer electrolyte membrane having, on the surface, said polymer having a charge group of opposite polarity, and then washing the solid polymer electrolyte membrane with a solvent capable of dissolving the polymer having a charge group of opposite polarity, to adhere the polymer on the surface of the solid polymer electrolyte membrane in an amount of 0.0001 to 0.5 mg/cm$^2$.

* * * * *